(12) United States Patent
Fujishiro et al.

(10) Patent No.: US 12,317,133 B2
(45) Date of Patent: May 27, 2025

(54) RELAY APPARATUS IN A MOBILE COMMUNICATION SYSTEM

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/166,670

(22) Filed: Feb. 3, 2021

(65) Prior Publication Data

US 2021/0160735 A1 May 27, 2021

Related U.S. Application Data

(63) Continuation of application No. PCT/JP2019/031185, filed on Aug. 7, 2019.

(Continued)

(51) Int. Cl.
*H04W 28/086* (2023.01)
*H04W 28/02* (2009.01)
(Continued)

(52) U.S. Cl.
CPC ... *H04W 28/0864* (2023.05); *H04W 28/0278* (2013.01); *H04W 36/0064* (2023.05); *H04W 74/0833* (2013.01); *H04W 76/30* (2018.02)

(58) Field of Classification Search
CPC ......... H04W 28/0815; H04W 28/0278; H04W 74/0833; H04W 76/30; H04W 84/047;
(Continued)

(56) References Cited

U.S. PATENT DOCUMENTS 10,178,594 B1 * 1/2019 Liu .................. H04B 7/15507
10,499,222 B2 12/2019 Adachi et al.
(Continued)

FOREIGN PATENT DOCUMENTS

JP 2014-027694 A 2/2014
WO 2016/163430 A1 10/2016

OTHER PUBLICATIONS

ZTE; "Discussion on IAB node access procedure"; 3GPP TSG-RAN WG2 Meeting #102; R2-1807401; May 21-25, 2018; total 6 pages; Busan, Korea.
(Continued)

*Primary Examiner* — Robert C Scheibel
(74) *Attorney, Agent, or Firm* — Studebaker Brackett PLLC

(57) ABSTRACT

A communication control method according to an embodiment is a method in a mobile communication system in which a data transfer path via at least one of relay apparatuses is configured between a donor base station and a user equipment. In the communication method, a relay apparatus is configured to activate a timer when establishment of a radio connection with an upper apparatus or activation of a relay function of the relay apparatus is rejected by the upper apparatus, or when the radio connection is released by the upper apparatus. The upper apparatus is another relay apparatus under the donor base station or the donor base station. The timer is configured to define time during which establishment of a radio connection with the upper apparatus or notification indicating an intention of activating the relay function to the upper apparatus needs to be avoided.

2 Claims, 16 Drawing Sheets

Related U.S. Application Data

(60) Provisional application No. 62/715,948, filed on Aug. 8, 2018.

(51) Int. Cl.
   *H04W 36/00*      (2009.01)
   *H04W 74/0833*    (2024.01)
   *H04W 76/30*      (2018.01)

(58) Field of Classification Search
   CPC ... H04W 88/14; H04W 40/22; H04W 88/085; H04W 92/20; H04W 28/0864
   See application file for complete search history.

(56) References Cited

U.S. PATENT DOCUMENTS

| | | | |
|---|---|---|---|
| 2012/0178449 A1 | 7/2012 | Liao | |
| 2017/0171784 A1* | 6/2017 | Mitsui | H04W 76/20 |
| 2018/0013658 A1* | 1/2018 | Wiesmaier | H04L 41/12 |
| 2020/0037136 A1 | 1/2020 | Adachi et al. | |
| 2020/0037200 A1* | 1/2020 | Cho | H04W 76/27 |
| 2020/0045766 A1* | 2/2020 | Kim | H04W 36/0005 |
| 2020/0235869 A1* | 7/2020 | Pradas | H04L 1/1867 |
| 2021/0045036 A1* | 2/2021 | Wei | H04W 40/04 |
| 2021/0045037 A1* | 2/2021 | Wei | H04W 40/12 |
| 2021/0127293 A1* | 4/2021 | Hong | H04L 5/0053 |
| 2021/0168645 A1* | 6/2021 | Adjakple | H04W 40/12 |
| 2021/0176655 A1* | 6/2021 | Qi | H04W 40/12 |
| 2021/0250884 A1* | 8/2021 | Iyer | H04W 56/0045 |
| 2021/0258847 A1* | 8/2021 | Wu | H04W 16/26 |
| 2021/0259051 A1* | 8/2021 | Latheef | H04W 76/12 |
| 2021/0266815 A1* | 8/2021 | Wei | H04W 40/02 |
| 2021/0297895 A1* | 9/2021 | Lee | H04W 28/0278 |
| 2021/0298088 A1* | 9/2021 | Qi | H04W 88/14 |

OTHER PUBLICATIONS

Huawei, Hisilicon; "Pre-BSR Enabling Fast Scheduling"; 3GPP TSG-RAN WG2 Meeting AH-1807; R2-1810700; May 2-6, 2018; total 3 pages; Montreal, Canada.

Huawei, Hisilicon; "Overall high layer design of IAB"; 3GPP TSG-RAN WG2 Ad Hoc; R2-1801131; Jan. 22-26, 2017; total 5 pages; Vancouver, Canada.

3rd Generation Partnership Project; Technical Specification Group Radio Access Network; Study on Integrated Access and Backhaul; 3GPP TR 38.874; V0.3.2; Jun. 2018; pp. 1-39; Release 15; 3GPP Organizational Partners.

AT&T "Summary of 7.7.1 Enhancements to support NR backhaul links", 3GPP TSG RAN WG1 Meeting #92bis, R1-1805673, Sanya, China, Apr. 16-20, 2018, total 14 pages.

Huawei, Hisilicon; "IP address management for IAB nodes", 3GPP TSG-RAN WG2 meeting #106, R2-1906066, Reno, USA, May 13-17, 2019, total 4 pages.

Huawei, Hisilicon; "Congestion reporting and handling for IAB networks", 3GPP TSG-RAN WG2#106, R2-1906067, Reno, USA, May 13-17, 2019, total 4 pages.

Ericsson; "Setup procedures for IAB-node and a UE connected to an IAB node", 3GPP TSG-RAN WG3 #100, R3-182780, Busan, Republic of Korea, May 21-25, 2018, total 9 pages.

\* cited by examiner

FIG. 7

| IAB NODE | DONOR CANDIDATE 1 | DONOR CANDIDATE 2 | DONOR CANDIDATE 3 | DONOR CANDIDATE 4 |
|---|---|---|---|---|
| IAB NODE#1 | gNB#1 | gNB#2 | gNB#3 | - |
| IAB NODE#2 | gNB#1 | gNB#3 | - | - |
| IAB NODE#3 | gNB#1 | gNB#4 | gNB#5 | gNB#6 |

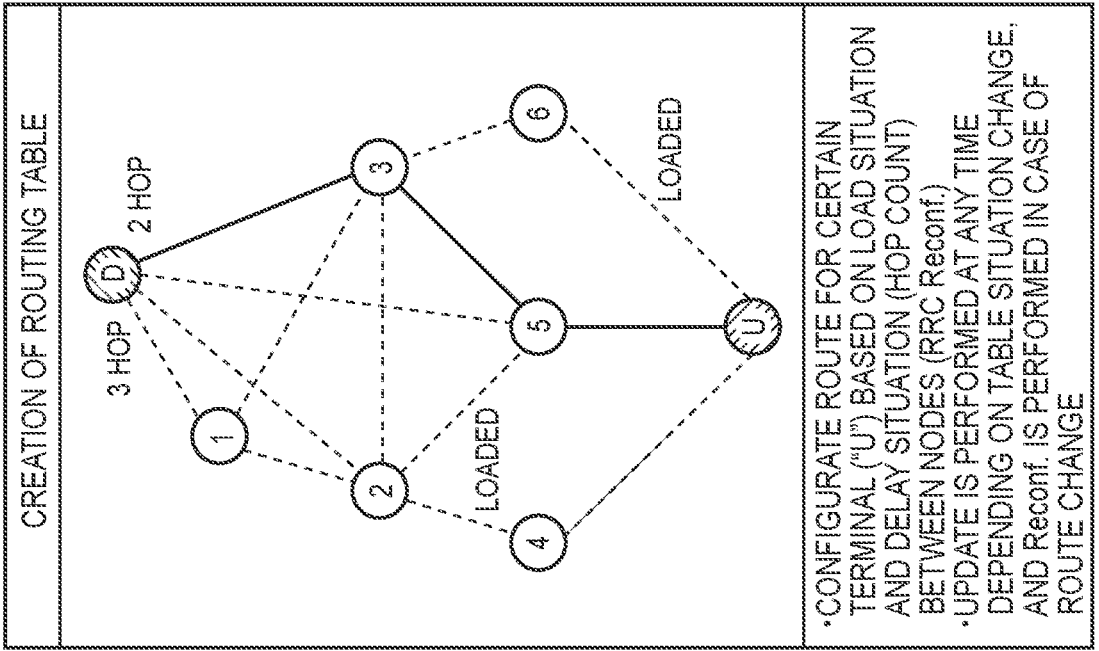

FIG. 12A
CREATION OF TOPOLOGY

- DERIVE RELATIONSHIP OF NODES IN WHICH ROUTE IS LIKELY TO BE ESTABLISHED BASED ON RADIO STATE (RSRP AND THE LIKE)
- AT LEAST IAB NODE MAY HAVE ROUTE INFORMATION BY RRC Reconf.

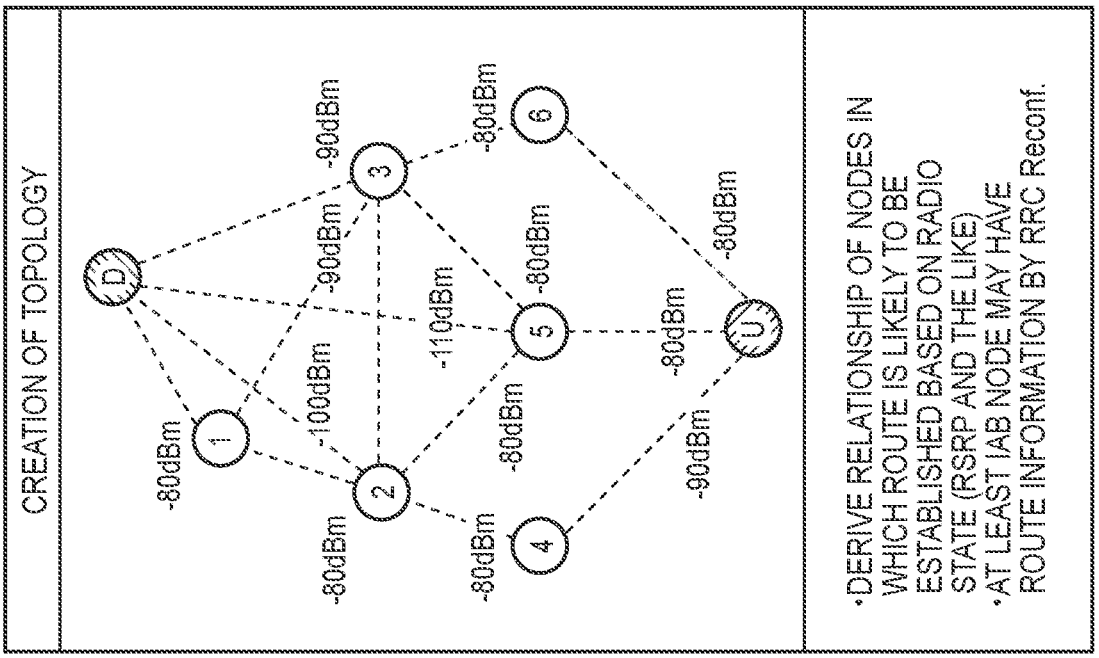

FIG. 12B
CREATION OF ROUTING TABLE

- CONFIGURATE ROUTE FOR CERTAIN TERMINAL ("U") BASED ON LOAD SITUATION AND DELAY SITUATION (HOP COUNT) BETWEEN NODES (RRC Reconf.)
- UPDATE IS PERFORMED AT ANY TIME DEPENDING ON TABLE SITUATION CHANGE, AND Reconf. IS PERFORMED IN CASE OF ROUTE CHANGE

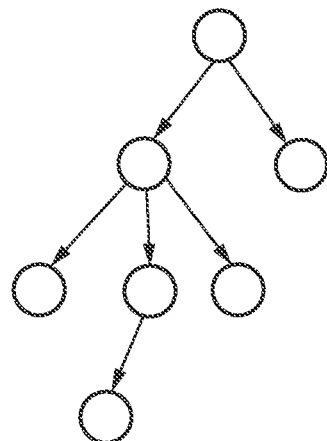
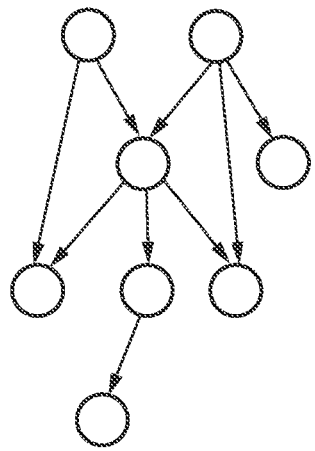
SPANNING TREE    DIRECTED ACYCLIC GRAPH
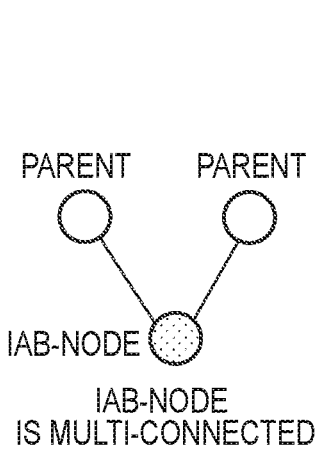
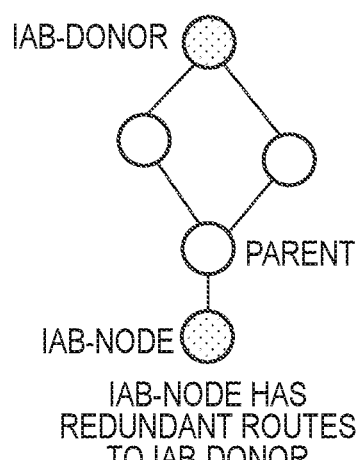
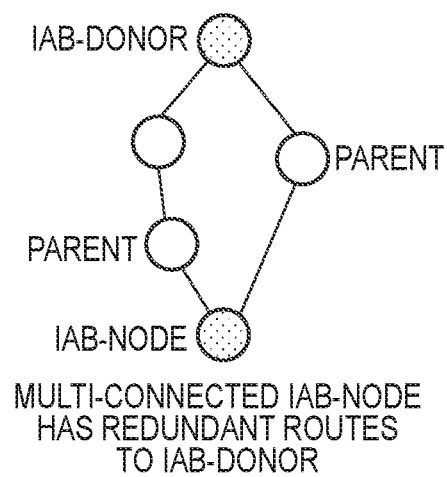
IAB-NODE IS MULTI-CONNECTED
IAB-NODE HAS REDUNDANT ROUTES TO IAB-DONOR
MULTI-CONNECTED IAB-NODE HAS REDUNDANT ROUTES TO IAB-DONOR
FIG. 16A          FIG. 16B          FIG. 16C

RELAY APPARATUS IN A MOBILE COMMUNICATION SYSTEM

RELATED APPLICATIONS

The present application is a continuation based on PCT Application No. PCT/JP2019/031185, filed on Aug. 7, 2019, which claims the benefit of U.S. Provisional Application No. 62/715,948 filed on Aug. 8, 2018. The content of which is incorporated by reference herein in their entirety.

TECHNICAL FIELD

The present disclosure relates to a relay apparatus.

BACKGROUND ART

The 3rd Generation Partnership Project (3GPP), which is a standardization project for mobile communication systems, is studying a new relay apparatus called an Integrated Access and Backhaul (IAB) node. One or a plurality of relay apparatuses are involved in communications between a base station and user equipment, and relay the communications. Such a relay apparatus has a user equipment function and a base station function, uses the user equipment function to perform radio communications with an upper node (base station or upper relay apparatus), and uses the base station function for performing radio communications with a lower node (user equipment or lower relay apparatus).

A radio section between the user equipment and the relay apparatus or the base station may be referred to as an access link. A radio section between the relay apparatus and the base station or another relay apparatus may be referred to as a backhaul link. 3GPP Contribution RP-170217 describes a method of integrating and multiplexing data communications in the access link and data communications in the backhaul link in Layer 2, and dynamically allocating radio resources to the backhaul link to dynamically switch the data transfer path.

SUMMARY

A communication control method according to an embodiment is a method in a mobile communication system in which a data transfer path via at least one of relay apparatuses is configured between a donor base station and a user equipment. The communication control method comprising: receiving by a relay apparatus, from a lower apparatus, a first buffer status report indicating an amount of data available for uplink transmission in the lower apparatus; and transmitting by the relay apparatus based on the first buffer status report, to an upper apparatus, a second buffer status report based on the amount of data available for uplink transmission in the lower apparatus. The upper apparatus is an upper relay apparatus under the donor base station or the donor base station. The lower apparatus is a lower relay apparatus under the relay apparatus or a user equipment under the relay apparatus.

A relay apparatus according to an embodiment is included in a mobile communication system in which a data transfer path via at least one of relay apparatuses is configured between a donor base station and a user equipment. The relay apparatus comprising: a receiver configured to receive from a lower apparatus, a first buffer status report indicating an amount of data available for uplink transmission in the lower apparatus; and a transmitter configured to transmit based on the first buffer status report, to an upper apparatus, a second buffer status report based on the amount of data available for uplink transmission in the lower apparatus. The upper apparatus is an upper relay apparatus under the donor base station or the donor base station. The lower apparatus is a lower relay apparatus under the relay apparatus or a user equipment under the relay apparatus.

A chipset according to an embodiment is a chipset for controlling a relay apparatus included in a mobile communication system in which a data transfer path via at least one of relay apparatuses is configured between a donor base station and a user equipment. The chipset comprising: a processor and a memory coupled to the processor. The processor configured to receiving from a lower apparatus, a first buffer status report indicating an amount of data available for uplink transmission in the lower apparatus; and transmitting based on the first buffer status report, to an upper apparatus, a second buffer status report based on the amount of data available for uplink transmission in the lower apparatus. The upper apparatus is an upper relay apparatus under the donor base station or the donor base station. The lower apparatus is a lower relay apparatus under the relay apparatus or a user equipment under the relay apparatus.

BRIEF DESCRIPTION OF DRAWINGS

FIG. 7 is a diagram illustrating an example of a table for determining a context transfer destination according to the first embodiment.

FIG. 12A illustrates an example of creation of a connection relationship (topology) according to the third embodiment, and FIG. 12B illustrates an example of creation of a routing table according to the third embodiment.

FIGS. 16A, 16B and 16C are a diagram illustrating links/paths in IAB topology and DAG.

DESCRIPTION OF EMBODIMENTS

Figure 1:
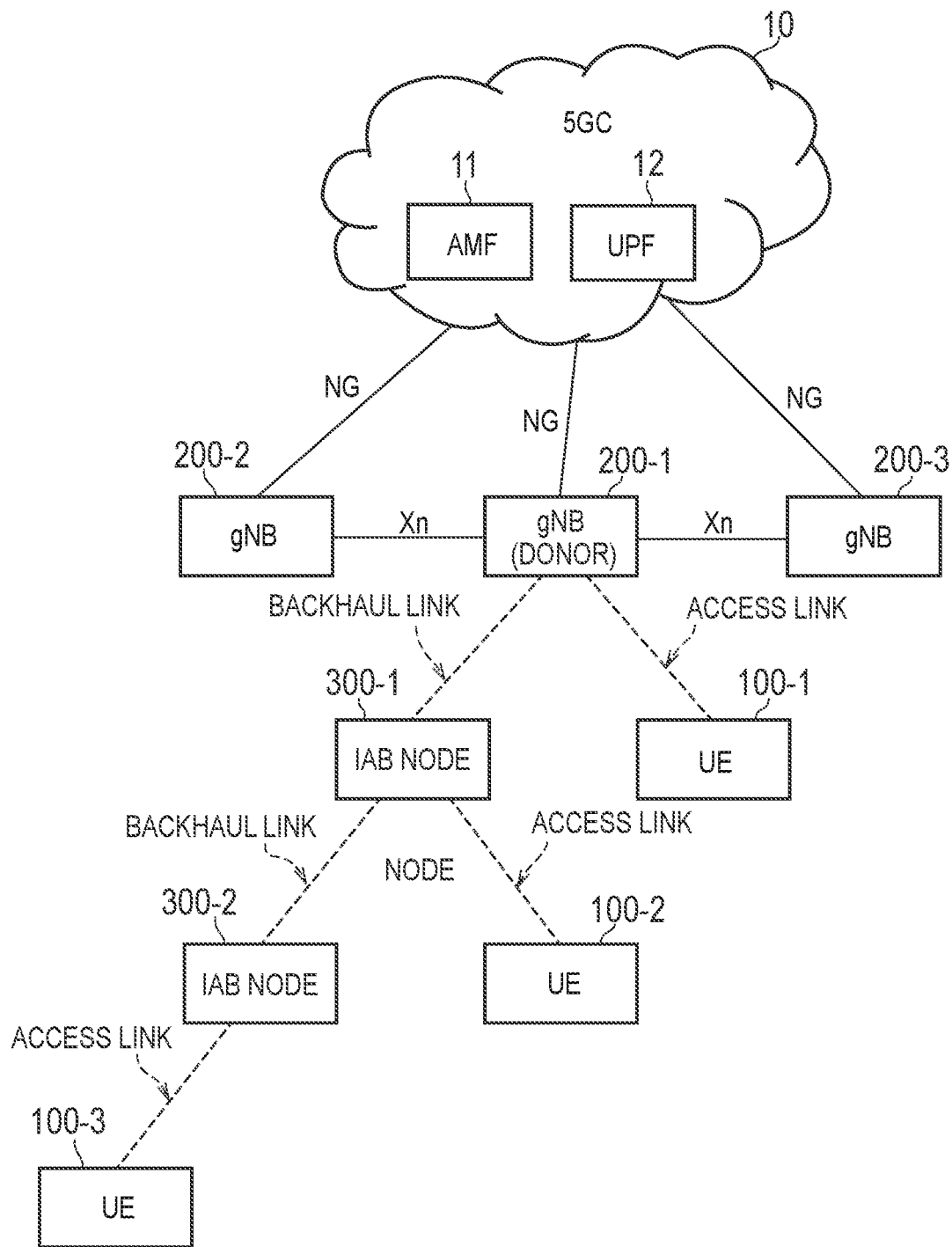
FIG. 1 is a diagram illustrating a configuration of a mobile communication system according to an embodiment.

A mobile communication system according to one embodiment will be described with reference to the accompanying drawings. Note that in the descriptions of the drawing below, identical or similar symbols are assigned to identical or similar portions.

(A Configuration of a Mobile Communication System)

A configuration of a mobile communication system according to an embodiment will be described. FIG. 1 is a diagram illustrating a configuration of a mobile communication system 1 according to an embodiment. The mobile communication system 1 is a 5G mobile communication system based on 3GPP standard. In particular, a radio access format in the mobile communication system 1 is NR (New Radio) which is a radio access format of 5G. However, LTE (Long Term Evolution) may be applied to the mobile communication system 1 at least partially.

As shown in FIG. 1, the mobile communication system 1 comprises a 5G core network (5GC) 10, a user equipment (UE) 100, a base station (referred to as gNB) 200, and an IAB node 300. In an embodiment, an example in which the base station is an NR base station will be mainly described, but the base station may be an LTE base station (i.e., an eNB).

The 5GC 10 comprises an AMF (Access and Mobility Management Function) 11 and an UPF (User Plane Function) 12. The AMF 11 is an apparatus which performs various mobility control with respect to the UE 100, and the like. The AMF 11 manages information of an area in which the UE 100 exists by using non-access stratum (NAS) signaling to communicate with the UE 100. The UPF 12 is an apparatus which performs data transfer control, and like.

The gNB 200 is connected to the 5GC 10 via an interface referred to as an NG interface. In FIG. 1, three gNB 200-1 to gNB 200-3 connected to the 5GC 10 are illustrated. The gNB 200 is a fixed radio communication device which performs radio communication with the UE 100. When the gNB 200 has a donor function, the gNB 200 may perform radio communication with an IAB node which wirelessly connects to itself.

The gNB 200 is connected to another gNB 200 in an adjacent relationship via an inter-base station interface referred to as an Xn interface. FIG. 1 shows an example in which the gNB 200-1 is connected to the gNB 200-2 and the gNB 200-2.

Each of the gNB 200 manages one or a plurality of cells. A cell is used as a term indicating the smallest unit of a radio communications area. A cell is also used as a term indicating a function or resource which performs radio communications with the UE 100. One cell belongs to one carrier frequency.

The UE 100 is a mobile radio communication device that performs radio communication with the gNB 200. The UE 100 may communicate with the IAB node 300. The UE 100 may be any device as long as it is a device that performs radio communication with the gNB 200 or the IAB node 300. For example, the UE 100 is a mobile phone terminal, a tablet terminal, a notebook PC, a sensor, a device installed in the sensor, a vehicle, or a device installed in vehicle.

FIG. 1 shows an example in which the UE 100-1 wirelessly connects to the gNB 200-1, the UE 100-2 wirelessly connects to the IAB node 300-1, and the UE 100-3 wirelessly connects to the IAB 300-2. The UE 100-1 directly communicates with the gNB 200-1. The UE 100-2 indirectly communicates with the gNB 200-1 via the IAB node 300-1. The UE 100-3 indirectly communicates with the gNB 200-1 via the IAB node 300-1 and the IAB node 300-2.

An IAB node 300 is a device (relay apparatus) that is involved in communications between an eNB 200 and a UE 100 and relays the communications. FIG. 1 illustrates an example in which an IAB node 300-1 is in radio connection with a gNB 200-1 serving as a donor and an IAB node 300-2 is in wireless connection with the IAB node 300-1. Each IAB node 300 manages a cell. The cell managed by the IAB node 300 may have a cell ID that may be the same as or different from the cell ID of the cell of the donor gNB 200-1.

The IAB node 300 has a UE function (user equipment function) and a gNB function (base station function). The IAB node 300 uses the UE function to perform radio communications with a upper node (the gNB 200 or a upper IAB node 300), and also uses the gNB function to perform radio communications with a lower node (UE 100 or lower IAB node 300). The UE function is at least a part of the functions of the UE 100, and the IAB node 300 does not necessarily need to have all the functions of the UE 100. The gNB function is at least a part of the functions of the gNB 200, and the IAB node 300 does not necessarily need to have all the functions of the gNB 200.

A radio section between the UE 100 and the IAB node 300 or gNB 200 may be referred to as an access link (or Uu). A radio section between the IAB node 300 and the gNB 200 or another IAB node 300 may be referred to as a backhaul link (or Un). Such a backhaul link may be referred to as a fronthaul link.

A relay path can be dynamically switched by integrating and multiplexing data communications in the access link and data communications in the backhaul link in Layer 2, and dynamically allocating radio resources to data communications in the backhaul link A millimeter wave band may be used for the access link and the backhaul link. In addition, the access link and the backhaul link may be time division and/or frequency division multiplexed.

(A Configuration of gNB)

Figure 2:
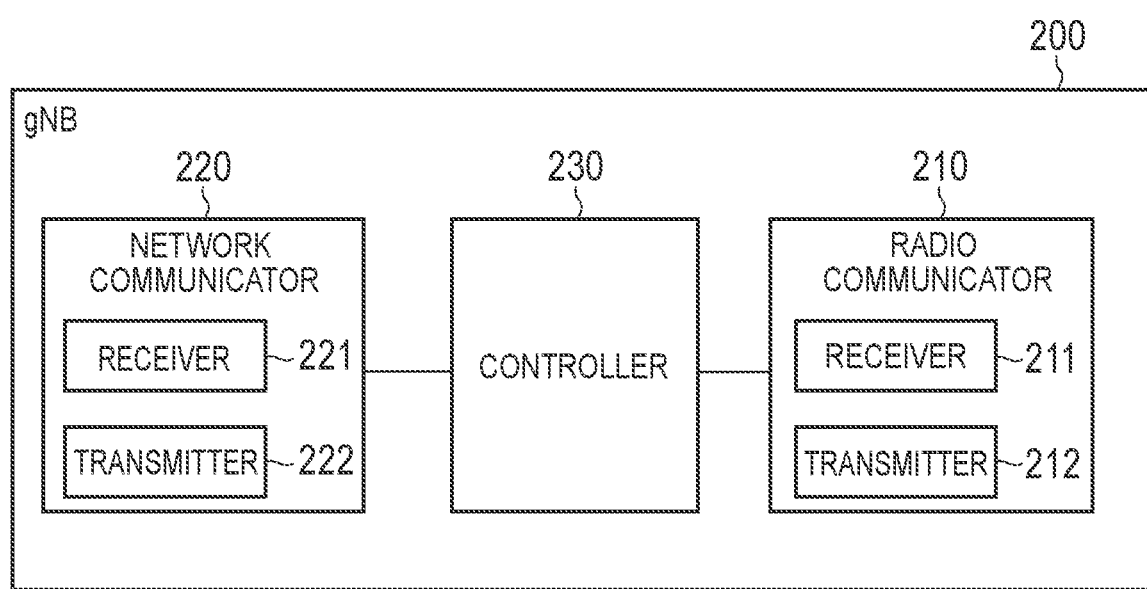
FIG. 2 is a diagram illustrating a configuration of a base station (gNB) according to the embodiment.

A configuration of the gNB 200 according to an embodiment will be described. FIG. 2 is a diagram illustrating a configuration of the gNB 200. As shown in FIG. 2, the gNB 200 comprises a radio communicator 210, a network communicator 220, and a controller 230.

The radio communicator 210 is used for radio communication with the UE 100 and radio communication with the IAB node 300. The radio communicator 210 includes a receiver 211 and a transmitter 212. The receiver 211 performs various receptions under the control of the controller 230. The receiver 211 includes an antenna and converts a radio signal received by the antenna into a baseband signal (received signal) and outputs the baseband signal to the controller 230. The transmitter 212 performs a variety of transmission under the control of the controller 230. The transmitter 212 includes an antenna and converts the baseband signal (transmitted signal) output from the controller 230 into the radio signal and transmits the radio signal from the antenna.

The network communicator 220 is used for wired communication (or wireless communication) with the 5GC 10 and wired communication (or wireless communication) with another adjacent gNB 200. The network communicator 220 includes a receiver 221 and a transmitter 222. The receiver 221 performs various receptions under the control of the controller 230. The receiver 221 receives a signal from the outside and outputs the reception signal to the controller 230. The transmitter 222 performs a variety of transmission under the control of the controller 230. The transmitter 222 transmits, to the outside, a transmission signal output from the controller 230.

The controller 230 performs various controls in the gNB 200. The controller 230 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

(A Configuration of IAB Node)

Figure 3:
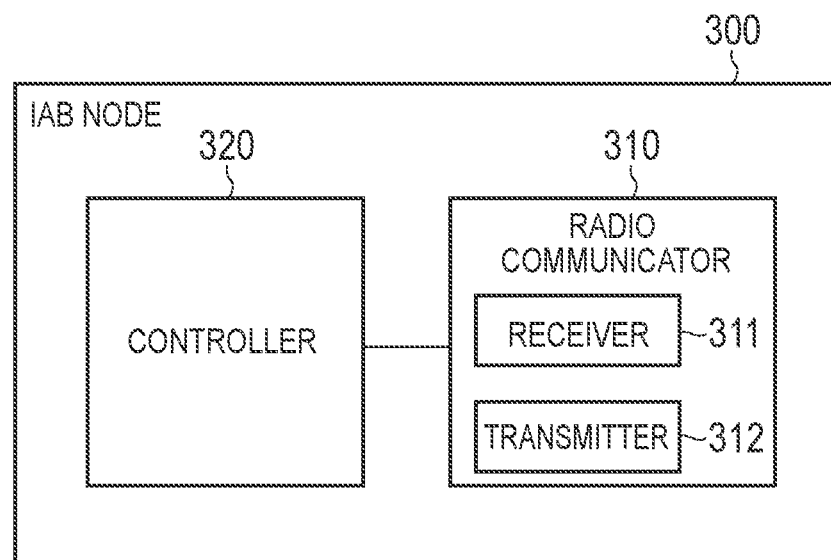
FIG. 3 is a diagram illustrating a configuration of a relay apparatus (IAB node) according to the embodiment.

A configuration of the IAB node 300 according to an embodiment will be described. FIG. 3 is a diagram illustrating a configuration of the IAB node 300. As shown in FIG. 3, the IAB node 300 comprises a radio communicator 310 and a controller 320.

The radio communicator 310 is used for radio communication with the gNB 200 (backhaul link) and radio communication with the UE 100 (access link). The radio communicator 310 includes a receiver 311 and a transmitter 312. The receiver 311 performs various receptions under the control of the controller 320. The receiver 311 includes an antenna and converts a radio signal received by the antenna into a baseband signal (received signal) and outputs the baseband signal to the controller 320. The transmitter 312 performs a variety of transmission under the control of the controller 320. The transmitter 312 includes an antenna and converts the baseband signal (transmitted signal) output from the controller 320 into the radio signal and transmits the radio signal from the antenna.

The controller 320 performs various controls in the IAB node 300. The controller 320 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

(A Configuration of UE)

Figure 4:
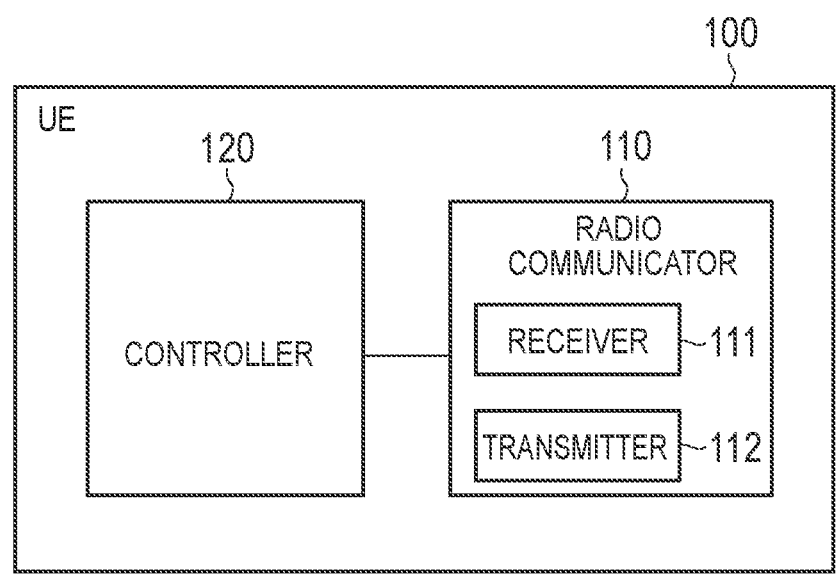
FIG. 4 is a diagram illustrating a configuration of a user equipment (UE) according to the embodiment.

A configuration of the UE 100 according to an embodiment will be described. FIG. 4 is a diagram illustrating a configuration of the UE 100. As shown in FIG. 4, the UE 100 comprises a radio communicator 110 and a controller 120.

The radio communicator 110 is used for radio communication in access link, i.e., radio communication with the gNB 200 and radio communication with the IAB node 300. The radio communicator 110 includes a receiver 111 and a transmitter 112. The receiver 111 performs various receptions under the control of the controller 120. The receiver 111 includes an antenna and converts a radio signal received by the antenna into a baseband signal (received signal) and outputs the baseband signal to the controller 120. The transmitter 112 performs a variety of transmission under the control of the controller 120. The transmitter 112 includes an antenna and converts the baseband signal (transmitted signal) output from the controller 120 into the radio signal and transmits the radio signal from the antenna.

The controller 120 performs various controls in the UE 100. The controller 120 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

(Example of Protocol Stack Configuration)

Figure 5:
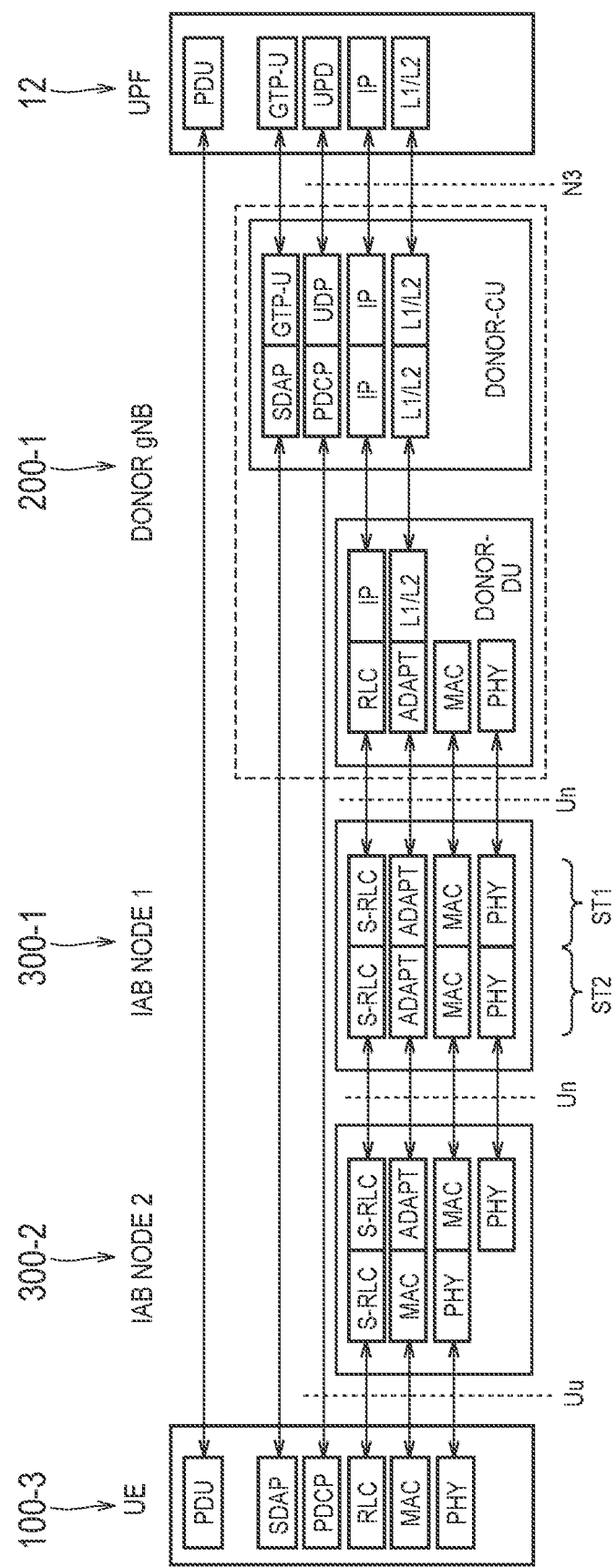
FIG. 5 is a diagram illustrating an example of a protocol stack configuration of a user plane in the mobile communication system according to the embodiment.

An example of a protocol stack configuration in the mobile communication system 1 according to an embodiment will be described. FIG. 5 is a diagram illustrating an example of a protocol stack configuration of a user plane. Here, an example of a protocol stack configuration related to user data transmission between a UE 100-3 and a UPF 12 in a 5GC 10 illustrated in FIG. 1 will be described.

As illustrated in FIG. 5, the UPF 12 includes a GPRS Tunneling Protocol for User Plane (GTP-U), User Datagram Protocol (UDP), Internet Protocol (IP), and Layer 1/Layer 2 (L1/L2). The gNB 200-1 (donor gNB) is provided with a protocol stack corresponding to these.

The gNB 200-1 includes a central unit (CU) and a distributed unit (DU). In the protocol stack of the radio interface, Packet Data Convergence Protocol (PDCP) and higher layers are provided to the CU, and Radio Link Control (RLC) and lower layers are provided to the DU. The CU and the DU are connected to each other via an interface referred to as an F1 interface.

Specifically, the CU includes Service Data Adaptation Protocol (SDAP), PDCP, IP, and L1/L2. SDAP and PDCP of the CU communicate with SDAP and PDCP of the UE 100 via the DU, the IAB node 300-1, and the IAB node 300-2.

The DU includes an RLC, an adaptation layer (Adapt), Medium Access Control (MAC), and a Physical layer (PHY) in the protocol stack of the radio interface. A protocol stack of these is a protocol stack for a gNB. The hierarchical relationship between the adaptation layer and the RLC (S-RLC) may be reversed.

The IAB node 300-1 is provided with a protocol stack ST1 that is for UE and corresponds to these. Furthermore, the IAB node 300-1 is provided with a protocol stack ST2 for gNB. The protocol stack ST1 and the protocol stack ST2 each include Layer 2 and lower layers (sublayers). Thus, the IAB node 300-1 is a Layer 2 relay apparatus that relays user data using Layer 2 and lower layers. The IAB node 300-1 performs relays the data without using Layer 3 and higher layers (specifically, PDCP and higher layers). The IAB node 300-2 has a protocol stack configuration similar to that of the IAB node 300-1.

The protocol stack configuration in the user plane is as described above. In a control plane on the other hand, the gNB 200-1, the IAB node 300-1, the IAB node 300-2, and the UE 100-3 each have Radio Resource Control (RRC) corresponding to Layer 3.

An RRC connection is established between the RRC of the gNB 200-1 (donor gNB) and the RRC of the IAB node 300-1, and RRC messages are transmitted and received using this RRC connection. An RRC connection is established between the RRC of the gNB 200-1 and the RRC of the IAB node 300-2, and RRC messages are transmitted and received using this RRC connection. Furthermore, an RRC connection is established between the RRC of the gNB 200-1 and the RRC of the UE 100-3, and RRC messages are transmitted and received using this RRC connection.

First Embodiment

An operation in the mobile communication system 1 according to a first embodiment will be described. Specifically, an operation performed in a case where the IAB node 300-1 establishes a radio connection to the gNB 200-1 (donor gNB) will be described.

In such a case, the IAB node 300-1 first establishes an access link connection (first radio connection) with the gNB 200-1 by using the UE function. In other words, the IAB node 300-1 functions as the UE 100 to establish an access link connection with gNB 200-1. The establishment of the access link connection includes establishment of the RRC connection.

Next, the gNB 200-1 transmits to the IAB node 300-1, a message for establishing a backhaul link connection (second radio connection) between the IAB node 300-1 and the gNB 200-1 for the gNB function of the IAB node 300-1, while maintaining the access link connection. In the first embodiment, this message is an RRC Reconfiguration message transmitted and received using the RRC connection.

As a result, the backhaul link connection is established between the IAB node 300-1 and the gNB 200-1, whereby backhaul link communications between the IAB node 300-1 and the gNB 200-1 can be started properly.

The RRC reconfiguration message for establishing the backhaul link connection may include configuration information on a bearer (or L2 link) forming the backhaul link connection, and a cell ID (specifically, transmission configuration on a reference signal and a synchronization signal associated with the cell ID) to be transmitted by the IAB node 300-1. Such an RRC reconfiguration message will be hereinafter referred to as an IAB node configuration message.

The IAB node configuration message may include configuration information on a default bearer (or default link). The default bearer (or default link) is, for example, a bearer (or link) for relaying SIB (System Information Block) and relaying Msg3 from UE.

The IAB node configuration message may include configuration information on the stack on the side of the donor gNB 200-1 and may optionally include configuration information on the stack on the side of the IAB node 300-2 (or UE 100). The configuration information on the stack on the side of the IAB node 300-2 (or UE 100) may be configured (in advance) by an operator (OAM) or a group of configurations implicitly notified using the SIB of the donor gNB 200-1 may be reused therefor.

The configuration contents in the IAB node configuration message basically include all the configurations included in the RRC reconfiguration message, and may also include an RLC configuration (an operation mode such as Acknowledged Mode (AM)/Unacknowledged Mode (UM)/Transparent Mode (TM), Logical Channel Prioritization (LCP) parameter, and the like), a MAC configuration (such as Buffer Status Report (BSR)/Timing Advance Group (TAG)/Power Headroom (PHR) parameters, and Discontinues Reception (DRX) configuration), and PHY configuration.

The configuration contents in the IAB node configuration message may further include a configuration of an adaptation layer (such as mapping (routing) configuration and priority configuration of lower side or higher side logical channel).

Furthermore, the configuration contents in the IAB node configuration message may include the (virtual) IP address (that is, the L3 address) of the IAB node 300-1 as appropriate. This is because the F1 protocol stack assumes SCTP over IP to be used for establishing an F1 interface on an L2 link for example.

The configuration contents in the IAB node configuration message is not limited to the configuration information on the NR protocol, but may be configuration information on the LTE protocol (RLC, MAC, PHY).

In the first embodiment, the IAB node 300-1 may transmit, to the gNB 200-1, an indication indicating that the IAB node 300-1 has the function of the IAB node (that is, the Layer 2 relay function) before establishment of the backhaul link connection or requests establishment of the backhaul link connection. This enables the gNB 200-1 to properly initiate a procedure for establishing the backhaul link connection. Hereinafter, such an indication will be referred to as an IAB indication. The IAB indication may include information indicating intention or capability for preparing the link protocol stack for the UE function in the IAB node 300-1 with LTE, NR, or both.

Note that the IAB node 300-1 may transmit the IAB indication after establishing the access link connection with the gNB 200-1, or transmit the IAB indication during the procedure for establishing the access link connection with gNB 200-1.

Furthermore, a condition for enabling the IAB indication to be transmitted to the gNB may include a condition that, from the gNB, the SIB including a donor function identifier indicating the gNB has the donor function has been received. Under such a condition, the IAB node 300-1 transmits the IAB indication to the gNB 200-1 only when the donor function identifier is received from the gNB 200-1 by the SIB.

In the first embodiment, when the gNB 200-1 has the donor function for establishing the backhaul link connection with the IAB node 300-1, the gNB 200-1 that has received the IAB indication from the IAB node 300-1 may transmit the IAB node configuration message to the IAB node 300-1. On the other hand, when the gNB 200-1 does not have the donor function, the gNB 200-1 that has received the IAB indication from the IAB node 300-1 may transmit a handover request for requesting the handover of the IAB node 300-1 to another gNB, instead of transmitting the IAB node configuration message to the IAB node 300-1. Preferably, the gNB 200-1 has information on another gNB having the donor function, stored in advance. The gNB 200-1 may acquire the information on the other gNB having the donor function from the IAB node 300-1. The IAB node 300-1 acquires the information from the 5GC 10 (core network) or checks the SIB (donor function identifier) of the adjacent cell to acquire the information on the other gNB (adjacent cell) having the donor function, and notifies the gNB 200-1 of the acquired information. The gNB 200-1 transmits a handover request to the other gNB having the donor function based on the stored information or the information acquired from the IAB node 300-1. As a result, after the IAB node 300-1 has been handed over to the other gNB, the IAB node 300-1 can establish the backhaul link connection with the other gNB. Alternatively, when the gNB 200-1 does not have the donor function, the IAB node 300-1 requests the 5GC 10 to perform the handover to the cell (gNB) having the donor function, and the 5GC 10 may execute processing related to the handover.

In the first embodiment, the gNB 200-1 may transmit a measurement configuration for configuring radio measurement to the IAB node 300-1 in response to the reception of the IAB indication from the IAB node 300-1. After receiving the measurement configuration from the gNB 200-1, the IAB node 300-1 transmits a measurement report including the result of the radio measurement to the gNB 200-1. The gNB 200-1 determines whether it (gNB 200-1) is the appropriate donor gNB or another gNB is the appropriate donor gNB, based on the measurement report from the IAB node 300-1. For example, based on the measurement reports, the gNB 200-1 determines that the other gNB is the appropriate donor gNB, when the measurement result for the other gNB is better than the own measurement result (for the gNB 200-1) with a difference between these measurement reports exceeding a threshold. Otherwise, the gNB 200-1 determines that it is the appropriate donor gNB.

Upon determining that it (gNB 200-1) is the appropriate donor gNB 200-1, the gNB 200-1 transmits an IAB node configuration message to the IAB node 300-1. Upon determining that another gNB is the appropriate donor gNB, the gNB 200-1 transmits a handover request for requesting the handover of the IAB node 300-1 to the other gNB, instead of transmitting the IAB node configuration message to the IAB node 300-1. Thus, after the IAB node 300-1 has been handed over to the other gNB under an excellent radio condition, the IAB node 300-1 can establish the backhaul link connection with the other gNB.

In the first embodiment, the gNB 200-1 may transmit context information about the IAB node 300-1 to another gNB after establishing the backhaul link connection. This context information includes AS layer connection configuration on the radio side (content of RRC reconfiguration), PDU (Protocol Data Unit) session resource configuration on the network side (such as UE ID and session ID, QoS (Quality of Service)/slice configuration of AMF or RAN (Radio Access Network)), and other related information (such as history information and preference information on behavior, communications, and the like of the IAB node.

Specifically, the gNB 200-1 transmits the context information about the IAB node 300-1 to another gNB in advance even without determining that the IAB node 300-1 is to be handed over to another gNB. Thus, when the radio condition between the gNB 200-1 and the IAB node 300-1 deteriorates and thus the IAB node 300-1 reestablishes the radio connection with another gNB, the reestablishment can be swiftly implemented using the context information shared in advance.

Here, the gNB 200-1 preferably holds a table in which the IAB node 300-1 is associated with candidates of the donor gNB for the IAB node 300-1. The gNB 200-1 transmits the context information to other gNBs that are the candidates in the table. This allows the gNB 200-1 to share the context information with the other appropriate gNBs.

(1) Example of Normal Operation Sequence

Figure 6:
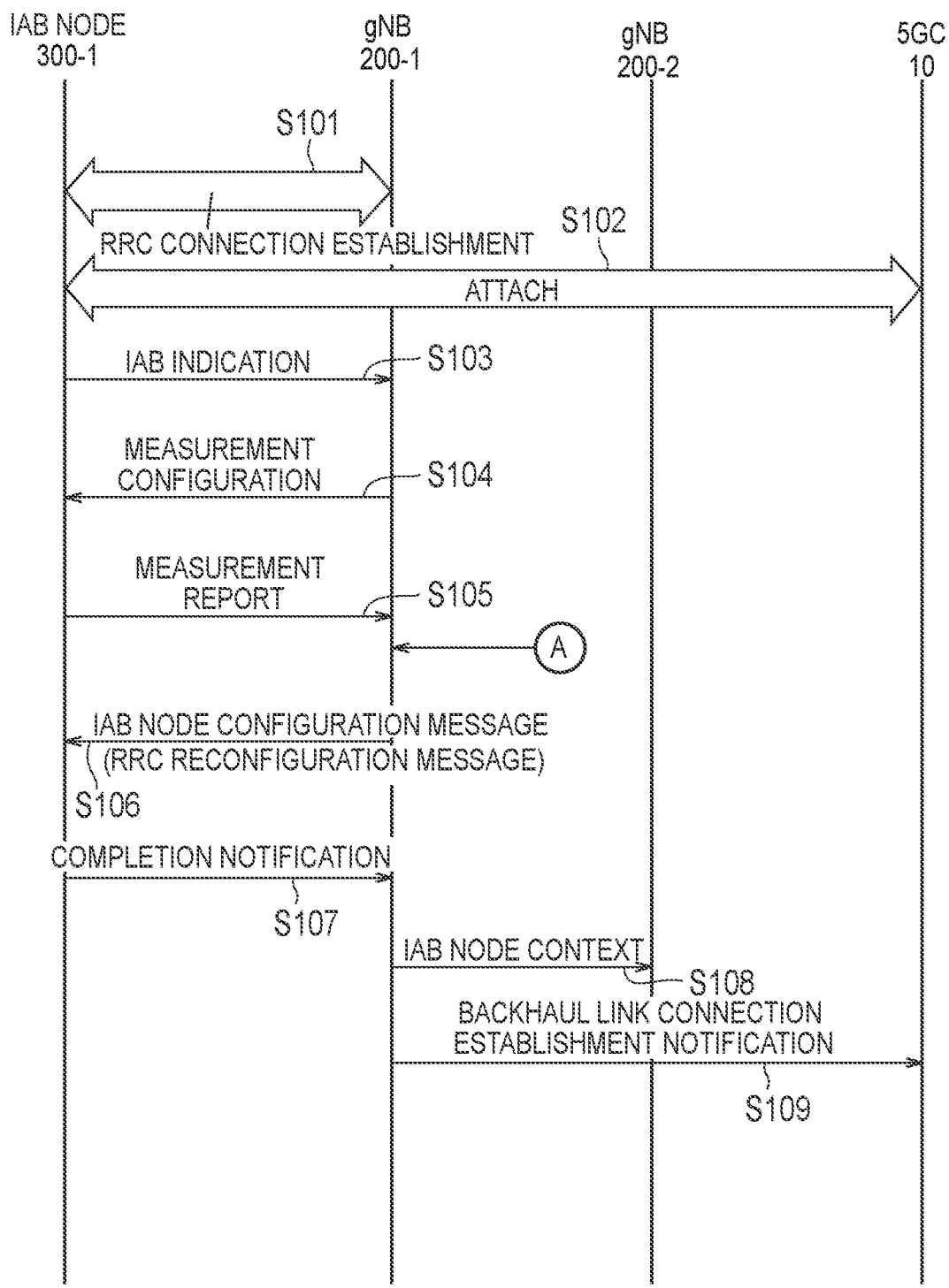
FIG. 6 is a diagram illustrating an example of a normal operation sequence according to a first embodiment.

FIG. 6 is a diagram illustrating an example of a normal operation sequence in the mobile communication system 1 according to the first embodiment.

As illustrated in FIG. 6, in step S101, the IAB node 300-1 establishes an access link connection (RRC connection) with the gNB 200-1 by, for example, performing a random access procedure for the gNB 200-1. The IAB node 300-1 may provide the IAB indication in a message (e.g., Msg3) transmitted to the gNB 200-1 during the random access procedure. The gNB 200-1 acquires context information about the IAB node 300-1 in step S101.

In step S102, the IAB node 300-1 performs an attach procedure to the 5GC 10 (specifically, AMF 11) via the gNB 200-1. Here, the IAB node 300-1 may notify the AMF 11 of a notification such as the IAB indication (that is, a notification indicating an intention to function as an IAB node). Thus, the IAB node 300-1 may acquire the list of candidate donor gNBs (cells), routing information indicating presence/absence of a lower node, other management information, and the like from the AMF 11. Alternatively, context information such as information indicating that the IAB node 300-1 is attached to each candidate donor gNB and routing information of the IAB node 300-1 may be notified from the AMF 11. If the IAB node 300-1 is already attached, the attach processing in step S102 can be omitted. Specifically, the attach processing by the IAB node 300-1 is omitted when the connection with the donor gNB needs to be reestablished due to a certain error, as in the RRC reestablishment in step S101.

In step S103, the IAB node 300-1 transmits the IAB indication to the gNB 200-1. The transmission of the IAB indication by the IAB node 300-1 may be triggered by satisfaction of one or a plurality of the following events.

When Msg5 (RRC Complete) is transmitted.

When the connection with gNB is established (this may be Msg5 and after, for example, when the first RRC reconfiguration is done).

When IAB configuration information (refer to the above description) is acquired from the AMF (including a case where IAB configuration information is already held).

Simply when there is an intention to function as an IAB node (including receiving an instruction to function as an IAB node from a higher layer).

When request to function as an IAB node is received from a lower IAB node 300-2 or UE 100-3 (when a signal indicating such a request is received from the lower IAB node 300-2 or the UE 100-3).

When the lower IAB node 300-2 or the UE 100-3 is already connected.

The IAB node 300-1 transmits the RRC message including the IAB indication to the gNB 200-1, for example. Such an RRC message may be a "UE Capability Information" message indicating the capability to function as a UE. Note that if the IAB indication is transmitted in step S101, step S103 can be omitted.

Alternatively, the AMF 11 may notify the gNB 200-1 of the IAB indication in a form of a change in the PDU session resource. The AMF may be an AMF for IAB management (dedicated).

The description on this normal operation sequence is given under an assumption that the gNB 200-1 has the donor capability. The gNB 200-1 determines that the backhaul link connection needs to be established with the IAB node 300-1, based on the IAB indication.

In step S104, the gNB 200-1 transmits the measurement configuration for configuring the radio measurement, to the IAB node 300-1. The IAB node 300-1 performs the radio measurement based on the measurement configuration. For example, the IAB node 300-1 measures the received power (received power of the cell-specific reference signal) for the cell of the current serving cell gNB 200-1 and the cell of the adjacent cell gNB 200-2.

In step S105, IAB node 300-1 transmits a measurement report including the results of the radio measurement to the gNB 200-1. The gNB 200-1 determines whether it (gNB 200-1) is the appropriate donor gNB or another gNB is the appropriate donor gNB, based on the measurement report. Here, the description proceeds under an assumption that the gNB 200-1 has determined that it (gNB 200-1) is the appropriate donor gNB. The processing of steps S104 and S105 is not essential and may be omitted.

In step S106, the gNB 200-1 transmits an IAB node configuration message (RRC reconfiguration message) to the IAB node 300-1. The IAB node configuration message may include a handover instruction designating the cell of the gNB 200-1 (i.e., the current serving cell of the IAB node 300-1) as the handover destination. The IAB node 300-1 executes processing of establishing a backhaul link connection with the gNB 200-1 based on the IAB node configuration message. Such establishment processing includes processing of generating a protocol stack (adaptation/RLC/MAC/PHY entity) for the backhaul link and configuring parameters based on the configuration information in the IAB node configuration message. Such establishment processing may include processing of preparing a protocol stack on the UE side (for an access link) and starting transmission of a synchronization signal or a cell-specific reference signal (or processing of preparing for the start).

In step S107, the IAB node 300-1 transmits a completion notification message to the gNB 200-1. The message indicates that the IAB node configuration, including the establishment of the backhaul link connection, has been completed. After step S107, the IAB node 300-1 functions as an IAB node instead of functioning as a UE, for the gNB 200-1.

In step S108, the gNB 200-1 transfers the context information acquired in step S101 to the gNB 200-2 over an Xn interface. The gNB 200-1 holds a table that associates the IAB node 300-1 with the candidate of the donor gNB of the IAB node 300-1, and determines the context transfer destination by referring to this table. With the gNB 200-1 thus transferring the context to other gNBs in advance, when the condition of the radio connection with the gNB connected to the IAB node 300-1 deteriorates, reconnection with the other gNB can be established immediately. FIG. 7 is a diagram illustrating an example of a table for determining the context transfer destination. Such a table is configured in advance for each gNB by, for example, an operator. As illustrated in FIG. 7, in the table, each IAB node is associated with candidates of the donor gNB for the IAB node. Specifically, each identifier related to the IAB node is associated with an identifier of a candidate of the donor gNB for the IAB node. For example, a gNB geographically close to an IAB node is configured to be a candidate of the donor gNB for that IAB node. Although an example of association with the gNB is described, association with cell IDs may be made. The cell ID may be a physical layer cell ID or a global cell ID. In addition, the gNB 200-1 may determine a gNB 200-1 geographically close to IAB node 300-1 as a donor candidate, based on the measurement report received from the IAB node 300-1. The gNB 200-1 may generate a table in which the IAB node 300-1 is associated with the candidate of the donor gNB for the IAB node 300-1 or update an existing such table, based on the determined donor candidate.

In step S109, the gNB 200-1 transmits a notification to the 5GC 10, indicating that the backhaul link connection with the IAB node 300-1 has been established. Alternatively, the gNB 200-1 may transmit a request to establish a PDU session for the IAB node to the 5GC 10. As described above, the PDU session establishment request may be transmitted from the AMF 11 to the gNB 200-1 before step S109 or in step S109.

(2) Example of Exceptional Operation Sequence

Figure 8:
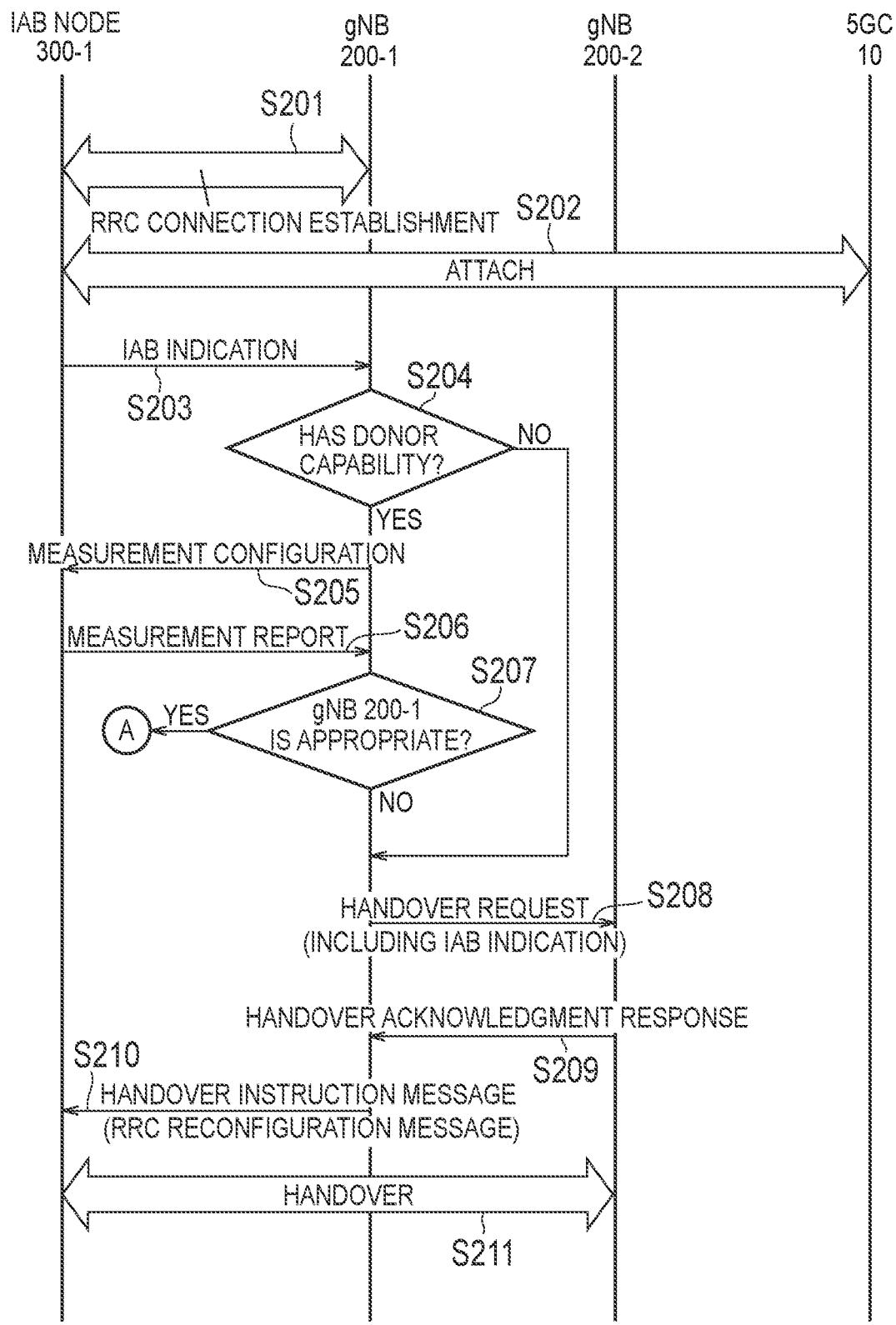
FIG. 8 is a diagram illustrating an example of an exceptional operation sequence according to the first embodiment.

FIG. 8 is a diagram illustrating an example of an exceptional operation sequence in the mobile communication system 1 according to the first embodiment. In the exceptional operation sequence, the gNB 200-1 implements handover of the IAB node 300-1 to the gNB 200-2.

As illustrated in FIG. 8, in step S201, the IAB node 300-1 establishes an access link connection (RRC connection) with the gNB 200-1 by, for example, performing a random access procedure for the gNB 200-1. The IAB node 300-1 may provide the IAB indication in a message (e.g., Msg3) transmitted to the gNB 200-1 during the random access procedure. The gNB 200-1 acquires context information about the IAB node 300-1 in step S201.

In step S202, the IAB node 300-1 performs an attach procedure to the 5GC 10 (specifically, AMF 11) via the gNB 200-1.

In step S203, the IAB node 300-1 transmits the IAB indication to the gNB 200-1. The IAB node 300-1 transmits the RRC message including the IAB indication to the gNB 200-1, for example. Such an RRC message may be a "UE Capability Information" message indicating the capability of a UE. Note that if the IAB indication is transmitted in step S201, step S203 can be omitted.

In step S204, the gNB 200-1 determines whether it has the donor capability. If the gNB 200-1 does not have the donor capability (step S204: NO), gNB 200-1 advances the processing to step S208.

If the gNB 200-1 has the donor capability (step S204: YES), in step S205, the gNB 200-1 transmits the measurement configuration for configuring the radio measurement, to the IAB node 300-1. The IAB node 300-1 performs the radio measurement based on the measurement configuration. For example, the IAB node 300-1 measures the received power (received power of the cell-specific reference signal) for the cell of the current serving cell gNB 200-1 and the cell of the adjacent cell gNB 200-2.

In step S206, the IAB node 300-1 transmits a measurement report including the results of the radio measurement to the gNB 200-1.

In step S207, the gNB 200-1 determines whether it (gNB 200-1) is the appropriate donor gNB or another gNB is the appropriate donor gNB, based on the measurement report. Upon determining that it (gNB 200-1) is the appropriate donor gNB (step S207: YES), the gNB 200-1 advances the processing to step S106 in the above-mentioned normal operation sequence (see FIG. 6).

On the other hand, upon determining that another gNB is the appropriate donor gNB (step S207: NO), the gNB 200-1 advances the processing to step S208.

In step S208, the gNB 200-1 transfers the handover request message including the IAB indication received from the IAB node 300-1, to the gNB 200-2 over the Xn interface. The gNB 200-1 may provide the context information acquired in step S201, in the handover request message. Alternatively, the gNB 200-1 may transmit the handover request message including information indicating a request for the IAB node 300-1 to function as the donor gNB for the gNB, instead of including the IAB indication. In step S208, the gNB 200-1 may transfer the handover request message to the gNB 200-2 over the Xn interface, upon determining that the gNB 200-2 has the donor capability. Specifically, for example, when the gNB 200-1 determines that gNB 200-2 is associated with IAB node 300-1 as a donor candidate based on the table illustrated in FIG. 7, the gNB 200-1 may transfer the handover request message to the gNB 200-2. In this case, the gNB 200-2 is less likely to reject the handover request, whereby the IAB node 300-1 can be handed over more swiftly. Alternatively, information about own donor capability may be shared in advance between a plurality of gNB 200s adjacent to each other, via the Xn interface. Thus, the gNB 200-1 can identify the adjacent gNB 200 having the donor capability, and can transfer the handover request message to the adjacent gNB 200 thus identified.

The gNB 200-2 determines whether to accept the handover of the IAB node 300-1, while taking the IAB indication included in the handover request message into consideration. The gNB 200-2 may reject the handover request if it does not have the donor capability. Here, the description will be given under an assumption that the gNB 200-2 has determined to accept the handover of the IAB node 300-1.

In step S209, the gNB 200-2 transmits a handover acknowledgment response message to the gNB 200-1 over the Xn interface.

In step S210, the gNB 200-1 transmits a handover instruction message (RRC reconfiguration message) to the IAB node 300-1, based on the handover acknowledgment response message from the gNB 200-2. The handover instruction message includes information for designating the (a cell of gNB 200-2) of the handover destination gNB 200-2.

In step S211, the IAB node 300-1 performs handover to the gNB 200-2 based on the handover instruction message from the gNB 200.

(3) Example of a Multi-Hop Connection Sequence

Figure 9:
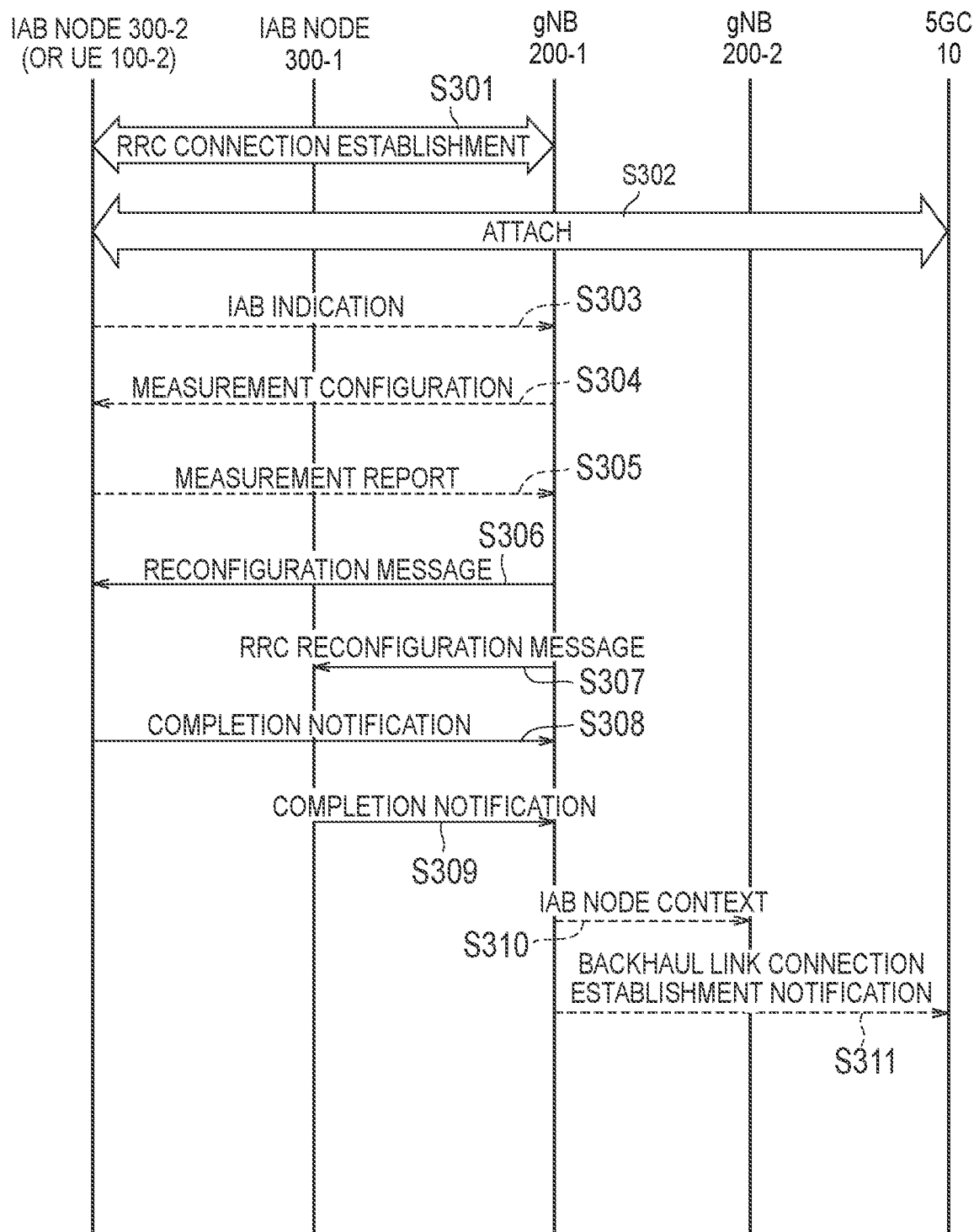
FIG. 9 is a diagram illustrating an example of a multi-hop connection sequence according to the first embodiment.

FIG. 9 is a diagram illustrating an example of a multi-hop connection sequence in the mobile communication system 1 according to the first embodiment. The multi-hop connection sequence is a sequence for the IAB node 300-2 or the UE 100-2 to be connected to the IAB node 300-1 after the backhaul link connection has been connected between the IAB node 300-1 and gNB 200-1. Here, a case where the IAB node 300-2 is connected to the IAB node 300-1 will be mainly described, but the IAB node 300-2 may be replaced with the UE 100-2 as appropriate. Furthermore, the description that has already been made in the above-mentioned "(1) Normal operation sequence" will be omitted.

As illustrated in FIG. 9, in step S301, the IAB node 300-2 establishes an access link connection (RRC connection) with the gNB 200-1 by performing a random access procedure for the gNB 200-1 via the IAB node 300-1. The IAB node 300-2 may transmit a message (e.g., Msg3) including the IAB indication to the gNB 200-1 during the random access procedure. The gNB 200-1 acquires context information about the IAB node 300-2 in step S301.

In step S302, the IAB node 300-2 performs an attach procedure to the 5GC 10 (specifically, AMF 11) via the IAB node 300-2 and the gNB 200-1. Here, the IAB node 300-2 may notify the AMF 11 of a notification such as the IAB indication (that is, a notification indicating an intention to function as an IAB node). Thus, the IAB node 300-2 may acquire the list of candidate donor gNBs (cells), routing information indicating presence/absence of a lower node, other management information, and the like from the AMF 11. Alternatively, context information such as information indicating that the IAB node 300-2 is attached to each candidate donor gNB and routing information of the IAB node 300-2 may be notified from the AMF 11. If the IAB node 300-2 is already attached, the attach processing in step S302 can be omitted. Specifically, the attach processing by the IAB node 300-2 is omitted when the connection with the donor gNB needs to be reestablished due to a certain error, as in the RRC reestablishment.

In step S303, the IAB node 300-2 transmits the IAB indication to the gNB 200-1 via the IAB node 300-1. What triggers the transmission of the IAB indication by the IAB node 300-2 may be similar to that described in step S103 of "(1) Normal operation sequence" described above.

The IAB node 300-2 transmits the RRC message including the IAB indication to the gNB 200-1, for example. Such an RRC message may be a "UE Capability Information" message indicating the capability to function as a UE. Note that if the IAB indication is transmitted in step S301, step S303 can be omitted.

Alternatively, the AMF 11 may notify the gNB 200-1 of the IAB indication in a form of a change in the PDU session resource. The AMF may be an AMF for IAB management (dedicated).

Since the gNB 200-1 is assumed to have the donor capability in this operation sequence, the gNB 200-1 determines that the backhaul link connection needs to be established between the IAB node 300-1 and IAB node 300-2 based on the IAB indication.

In step S304, the gNB 200-1 transmits the measurement configuration for configuring the radio measurement, to the IAB node 300-2. The IAB node 300-2 performs the radio measurement based on the measurement configuration.

In step S305, the IAB node 300-2 transmits a measurement report including the results of the radio measurement to the gNB 200-1 via the IAB node 300-1. The gNB 200-1 determines whether it (gNB 200-1) is the appropriate donor gNB or another gNB is the appropriate donor gNB, based on the measurement report. Here, the description proceeds under an assumption that the gNB 200-1 has determined that it (gNB 200-1) is the appropriate donor gNB. The processing of steps S304 and S305 is not essential and may be omitted.

In step S306, the gNB 200-1 transmits an IAB node configuration message (RRC reconfiguration message) to the IAB node 300-2. The IAB node 300-2 executes processing of establishing a backhaul link connection with the IAB node 300-1 based on the IAB node configuration message. Such establishment processing includes processing of generating a protocol stack (adaptation/RLC/MAC/PHY entity) for the backhaul link and configuring parameters based on the configuration information in the IAB node configuration message. Such establishment processing may include processing of preparing a protocol stack on the UE side (for an access link) and starting transmission of a synchronization signal or a cell-specific reference signal (or processing of preparing for the start).

In step S307, the gNB 200-1 transmits an RRC reconfiguration message to the IAB node 300-1. Such an RRC reconfiguration message is a message for changing the configuration in the IAB node 300-1 due to the addition of the IAB node 300-2. Such an RRC reconfiguration message includes, for example, mapping information indicating association between a logical channel of the IAB node 300-2 and a logical channel of the backhaul link of the IAB node 300-1. Note that step S307 may be executed before step S306 or concurrently with step S306.

In step S308, the IAB node 300-2 transmits a completion notification message to the gNB 200-1. The message indicates that the IAB node configuration, including the establishment of the backhaul link connection with the IAB 300-1, has been completed. After step S308, the IAB node 300-2 functions as an IAB node instead of functioning as a UE, for the gNB 200-1.

In step S309, the IAB node 300-1 transmits a completion notification message to the gNB 200-1. The message indicates that the configuration change due to the establishment of the backhaul link connection with the IAB 300-2, has been completed. Note that step S309 may be executed before step S308 or concurrently with step S308.

In step S310, the gNB 200-1 transfers the context information on the IAB node 300-2 acquired in step S301 to the gNB 200-2 over the Xn interface.

In step S311, the gNB 200-1 transmits a notification to the 5GC 10, indicating that the backhaul link connection with the IAB node 300-2 has been established. Alternatively, the gNB 200-1 may transmit a request to establish a PDU session for the IAB node 300-2 to the 5GC 10. As described above, the PDU session establishment request may be transmitted from the AMF 11 to the gNB 200-1 before step S311 or in step S311.

[Variation of the First Embodiment]

In the example described in the above first embodiment, the IAB node 300-1 is handed over to the gNB 200-1 due to the gNB 200-1 not having the donor capability after the IAB node 300-1 has established a radio connection with the gNB 200-1. In such an example, each gNB 200 may provide information indicating whether it has the donor capability to the IAB node 300-1. This enables the IAB node 300-1 to select the gNB 200 having the donor capability and establish the connection with such a gNB 200. For example, the gNB 200 having the donor capability broadcasts a system information block (SIB) including information indicating that it has the donor capability. The IAB node 300-1 selects the gNB 200 to be the connection destination, based on the SIB. When the gNB 200 has the donor capability and the received power from this gNB 200 does not fall below a threshold, the IAB node 300-1 may select this gNB 200 as the connection destination. Alternatively, when the gNB 200 does not have donor capability, the IAB node 300-1 may reselect, upon receiving the SIB transmitted from the gNB 200, another gNB 200. Then, when the SIB transmitted from the other gNB 200 indicates that the other gNB 200 has the donor capability, the IAB node 300-1 performs the random access procedure for the other gNB 200 regarded as the connection destination and may transmit the IAB indication.

Alternatively, each gNB 200, in addition to notifying by the SIB that the gNB 200 has the donor ability (donor function), or instead of notifying by the SIB that the gNB 200 has the donor ability, may notify by the SIB that the gNB 200 itself has the ability of handling the IAB node 300. For example, each gNB 200 may notify by the SIB that the gNB 200 itself has a function of performing handover of the IAB node 300 to another gNB (donor gNB).

In the first embodiment described above, an example of including the IAB indication in the message (for example, Msg3) sent by the IAB node 300 to the gNB 200 during the random access procedure is described. Here, Msg3 is, for example, an RRC Setup Request message. Further, the IAB node 300 may include the IAB indication in Establishment Cause, which is a field (information element) in Msg3.

Alternatively, the IAB node 300 may use the random access preamble (Msg1) sent to the gNB 200 during the random access procedure to notify the IAB indication. For example, in a case where the SIB gives notification of the Physical Random Access Channel (PRACH) resources for the IAB indication, the IAB node 300 may notify the IAB indication by transmitting the random access preamble using the PRACH resources selected from the notified PRACH resources for the IAB indication. Here, the PRACH resources may be time/frequency resources or a signal sequence (preamble sequence). Thus, the donor base station broadcasts system information block (SIB) including information indicating Physical Random Access Channel (PRACH) resources that is only used by relay apparatuses.

Alternatively, the IAB node 300 may notify the IAB indication at a timing other than the random access procedure. For example, the IAB indication may be included in RRC messages such as a UE Assistance Information message.

In the first embodiment described above, the example in which the gNB 200 transmits the measurement configurations for configuring the radio measurement to the IAB node 300 or the UE 100 and receives a measurement report including the result of the radio measurement, so that whether the gNB 200 itself is an appropriate donor or another gNB is an appropriate donor gNB is determined based on the measurement report is described. However, without limitation to the case where the measurement result is used at the time of such initial connection, the measurement report may be used for changing the network topology or changing the data transfer path.

Second Embodiment

The second embodiment will be described based mainly on a difference from the first embodiment described above. The second embodiment may be implemented in combination with the first embodiment described above and a variation of the first embodiment.

A communication control method according to the second embodiment is a method in a mobile communication system in which a data transfer path via at least one IAB node 300 is configured between the donor gNB 200 and the UE 100. The communication control method according to the second embodiment activates the timer in a case where the establishment of a radio connection of the IAB node 300 with the upper apparatus is rejected or the activation of the relay function of the IAB node 300 is denied by the upper apparatus, or in a case where the radio connection is released by the upper apparatus. Here, the upper apparatus is another IAB node (upper IAB node) under the donor gNB 200 or the donor gNB 200. The upper apparatus may be an apparatus that has an RRC connection with the IAB node 300 (that is, an apparatus that has an RRC layer). The timer specifies the time during which establishment of a radio connection with the upper apparatus or notification indicating the intention of activating the relay function with the upper apparatus needs to be avoided. The notification indicating the intention of activating the relay function is the above-mentioned IAB indication.

In a case of finding another upper apparatus (for example, another donor gNB or IAB node) that corresponds the relay function during a period from the activation of the timer to the expiration of the timer, the IAB node 300 may establish the radio connection with the another upper apparatus and notify the another upper apparatus of the intention to activate the relay function. The another upper apparatus that corresponds the relay function may be an upper apparatus that transmits an SIB indicating that the apparatus has the donor function, or an upper apparatus that transmits an SIB indicating that the apparatus has the ability to handle an IAB node.

In the operation pattern 1 according to the second embodiment, the IAB node 300 notifies an upper apparatus of the intention (IAB indication) of activating the relay function when establishing a radio connection with the upper apparatus (that is, during a random access procedure). For example, the IAB node 300 uses Msg1 or Msg3 of the random access procedure to make the notification. The IAB node 300 receives a connection reject message for rejecting establishment of a radio connection from the upper apparatus. The connection reject message may be an RRC Connection Reject message. The IAB node 300 activates the timer in response to receiving of a connection reject message including information indicating that activation of the relay function is not possible (for example, "IAB connection unavailable"). The information ("IAB connection unavailable") may be included in the information element "Cause" in the connection reject message. After the timer is activated, the IAB node 300 does not attempt to establish a radio connection with the upper apparatus until the timer expires. For example, the IAB node 300 does not initiate a random access procedure for the upper apparatus until the timer expires. The IAB node 300 may be considered to be in a state where access to the upper apparatus is prohibited. After the timer expires, the IAB node 300 may attempt to establish a radio connection with the upper apparatus. Note that, in a case where the IAB node 300 does not intend to activate the relay function but desires to establish a radio connection with the upper apparatus, the IAB node 300 may attempt to establish a radio connection with the upper apparatus even before the timer expires. In that case, the IAB node 300 does not notify the upper apparatus of the intention (IAB indication) of activating the relay function.

In the operation pattern 2 according to the second embodiment, the IAB node 300 notifies an upper apparatus of the intention (IAB indication) of activating the relay function after establishing a radio connection with the upper apparatus (that is, after a random access procedure). For example, the IAB node 300 makes the notification by including the IAB indication in the RRC message such as the UE Assistance Information message. The IAB node 300 receives a connection release message for releasing a radio connection from the upper apparatus. The connection release message may be an RRC Connection Release message. The IAB node 300 activates the timer in response to receiving of a connection release message including information indicating that activation of the relay function is not possible (for example, "IAB connection unavailable"). The information ("IAB connection unavailable") may be included in the information element "Cause" in the connection release message. After the timer is activated, the IAB node 300 does not attempt to establish a radio connection with the upper apparatus until the timer expires. For example, the IAB node 300 does not initiate a random access procedure for the upper apparatus until the timer expires. The IAB node 300 may be considered to be in a state where access to the upper apparatus is prohibited. After the timer expires, the IAB node 300 may attempt to establish a radio connection with the upper apparatus.

In the operation pattern 3 according to the second embodiment, the IAB node 300 notifies an upper apparatus of the intention (IAB indication) of activating the relay function when establishing a radio connection with the upper apparatus, or after establishing a radio connection with the upper apparatus. The IAB node 300 receives a reconfiguration message (RRC message) including information indicating rejection to activate the relay function (for example, "IAB connection unavailable") from the upper apparatus. The reconfiguration message may be an RRC Reconfiguration message. In this operation pattern, the IAB node 300 may establish or maintain a radio connection with the upper apparatus even if activation of the relay function is rejected by the upper apparatus. The IAB node 300 activates the timer in response to receiving of a reconfiguration message including information indicating rejection to activate the relay function. After the timer is activated, the IAB node 300 does not send an IAB indication to the upper apparatus until the timer expires. After the timer expires, the IAB node 300 may send an IAB indication to the upper apparatus. Note that, in a case where the IAB node 300 releases a radio connection with the upper apparatus (in a case where the IAB node 300 receives a connection release message (RRC Connection Release message) from the upper apparatus) by the time the timer expires, the IAB node 300 may stop, abandon, or release the timer.

In the second embodiment, the timer may be configured from the upper apparatus (for example, the donor gNB 200) to the IAB node 300. The timer may be configured by the SIB, may be configured by the connection reject message in the operation pattern 1, may be configured by the connection release message in the operation pattern 2, or may be configured by the reconfiguration message in the operation pattern 3. Alternatively, the timer may be configured in advance in the IAB node 300.

Time set to the timers according to the operation patterns 1 and 2 according to the second embodiment (hereinafter referred to as "timer for IAB node") may be longer than time set to a timer used by the UE 100 when a connection is rejected or released (hereinafter referred to as "timer for UE"). The "timer for UE" is a timer included in the connection reject message and connection release message, and may be time during which the UE 100 needs to wait until an attempt to establish a connection can be made again after receiving the messages (for example, Wait time). For example, in a case where the IAB node 300 establishes a radio connection with another IAB node, it is assumed that there may be no connection (backhaul link) between the another IAB node and the donor gNB 200. In such a case, the IAB node 300 cannot activate the relay function unless a connection (backhaul link) is established between the another IAB node and the donor gNB 200. Therefore, using the timer for IAB node can reduce the frequency of failure of an attempt to establish a radio connection by the IAB node 300.

Figure 10:
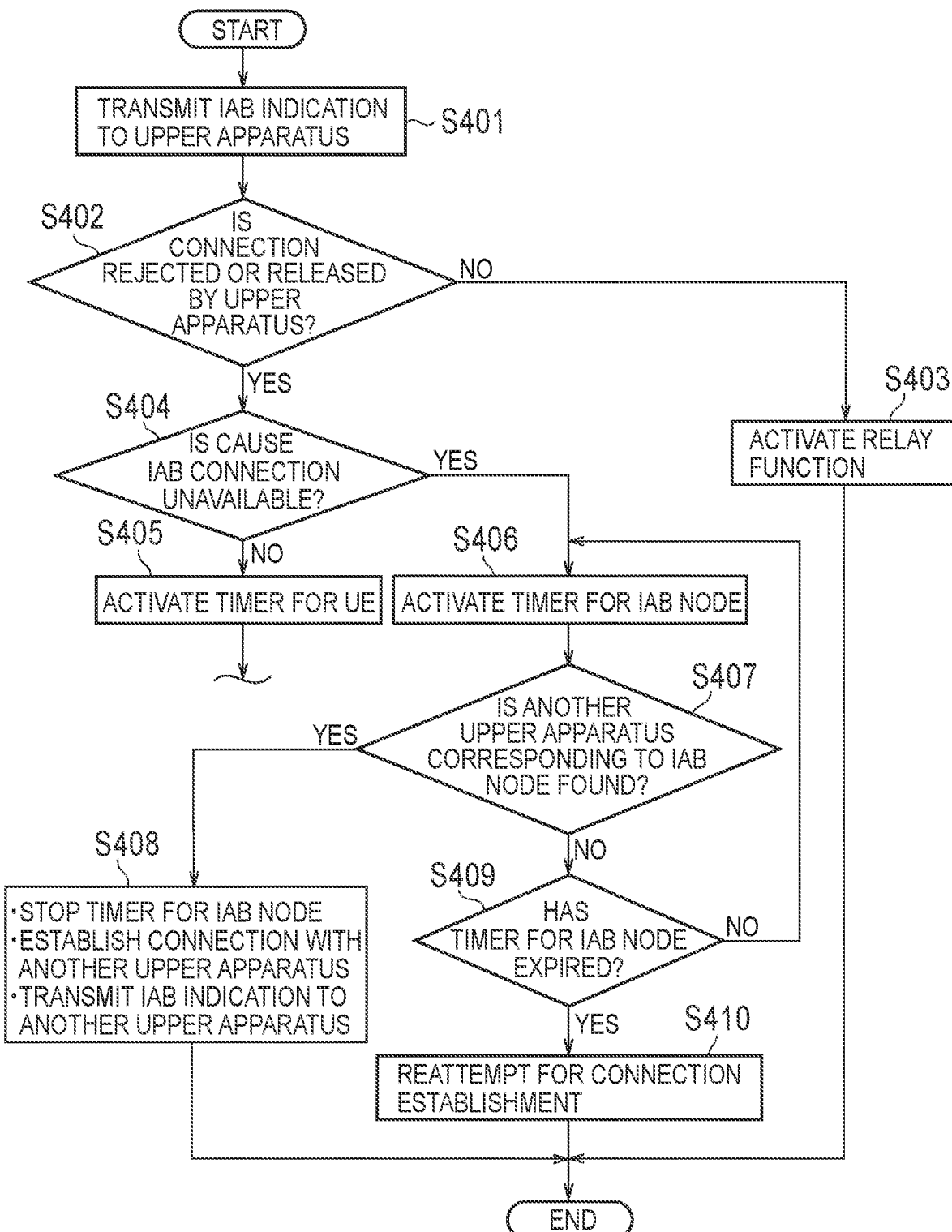
FIG. 10 is a diagram illustrating an operation example of the IAB node according to a second embodiment.

FIG. 10 is a diagram illustrating an operation example of the IAB node 300 according to the second embodiment. Here, the operation patterns 1 and 2 according to the second embodiment are assumed.

As illustrated in FIG. 10, in Step S401, the IAB node 300 transmits IAB indication to an upper apparatus when establishing a radio connection with the upper apparatus or after establishing a radio connection with the upper apparatus. In a case where a connection is not rejected or released by the upper apparatus after sending the IAB indication (Step S402: NO), in Step S403, the IAB node 300 activates the relay function and establishes a backhaul link with the upper apparatus like in the operation of the first embodiment described above.

In a case where a connection is rejected or released by the upper apparatus after sending the IAB indication (Step S402: YES), that is, in a case where the IAB node 300 receives a connection reject message or connection release message from the upper apparatus, in Step S404, the IAB node 300 checks whether or not "Cause" in the message is "IAB connection unavailable". In a case where "Cause" in the message is not "IAB connection unavailable" (Step S404: NO), in Step S405, the IAB node 300 activates the timer for UE. Note that, in Step S405, the IAB node 300 does not activate the timer for IAB node. Further, in a case where Step S404 is NO, the timer for IAB node does not need to be included in the connection reject message or the connection release message, and, even if included, the timer is not activated. After that, the IAB node 300 executes the same operation as a normal UE.

In a case where "Cause" in the message is "IAB connection unavailable" (Step S404: YES), in Step S406, the IAB node 300 activates the timer for IAB node. The IAB node 300 does not attempt to establish a radio connection with the upper apparatus while the timer is operating. The IAB node 300 may search for another upper apparatus (for example, another donor gNB or IAB node) that corresponds the relay function while the timer is operating.

In Step S407, the IAB node 300 checks whether or not another upper apparatus that corresponds the relay function is found. In a case where another upper apparatus that corresponds the relay function is found (Step S407: YES), in Step S408, the IAB node 300 stops the timer for IAB and attempts to establish a radio connection with the another upper apparatus. Here, the IAB node 300 may transmit the IAB indication to the another upper apparatus. In this case, the IAB node 300 finds another upper apparatus by the same operation as the cell selection of an UE, waits for the another upper apparatus, and then attempts to establish a radio connection with the another upper apparatus.

In a case where another upper apparatus that corresponds the relay function is not found (Step S407: NO), in Step S409, the IAB node 300 checks whether or not the timer for IAB node has expired. In a case where the timer for IAB node has not expired (Step S409: NO), the processing returns to Step S407. Note that, in a case where there is no other suitable upper apparatus (for example, another donor gNB 200), after a radio connection with an upper apparatus is established by a reattempt to establish a connection in Step S410 described later, the IAB node 300 may notify the network (the donor gNB 200 or 5GC 10) of the fact.

In a case where the timer for IAB node has expired (Step S409: YES), in Step S410, the IAB node 300 attempts to establish a radio connection again with the upper apparatus that rejects or releases the connection in Step S402. In a case where the establishment of the radio connection fails, the IAB node 300 may activate the same timer for IAB node again or activate a longer timer for IAB node.

[Variation of the Second Embodiment]

In the IAB node 300 according to the second embodiment described above, an AS layer that receives rejection of connection, release of connection, or rejection of activation of the relay function from the upper apparatus may give notification to a layer higher than the AS layer. The AS layer includes a PHY layer, a MAC layer, an RLC layer, a PDCP layer, an SDAP layer, and an RRC layer. Here, an RRC layer is mainly assumed. The upper layer is a NAS layer, an application layer, or the like.

For example, the upper layer of the IAB node 300 may make a transition to a command waiting mode from an Operation Administration Maintenance (OAM) apparatus of the network operator. The upper layer may stop instructing the AS layer to establish a connection as an IAB node and instruct the AS layer to establish a connection as a UE. The upper layer may send error information (which may include failure details, occurrence location information, and occurrence time information) to the OAM apparatus.

Third Embodiment

The third embodiment will be described based mainly on a difference from the first embodiment and the second embodiment described above. The third embodiment may be implemented in combination with at least one of the first and second embodiments described above.

A communication control method according to the third embodiment is a method in a mobile communication system in which a data transfer path via at least one IAB node 300 is configured between the donor gNB 200 and the UE 100. Each of a plurality of the IAB nodes 300 under the donor gNB 200 notifies an upper apparatus of at least one of information indicating a radio state of the own IAB node 300, information indicating a load state of the own IAB node 300, and information indicating a communication delay state of the own IAB node 300. Here, the upper apparatus is another IAB node (upper IAB node) under the donor gNB 200 or the donor gNB 200. The upper apparatus may be an apparatus that has an RRC connection with the IAB node 300 (that is, an apparatus that has an RRC layer). In the third embodiment, an example in which the upper apparatus is the donor gNB 200 will be mainly described. The donor gNB 200 manages or changes at least one of a connection relationship and a data transfer path in a plurality of the IAB nodes 300 based on the information notified from each of a plurality of the IAB nodes 300 under the donor gNB 200.

Figure 11:
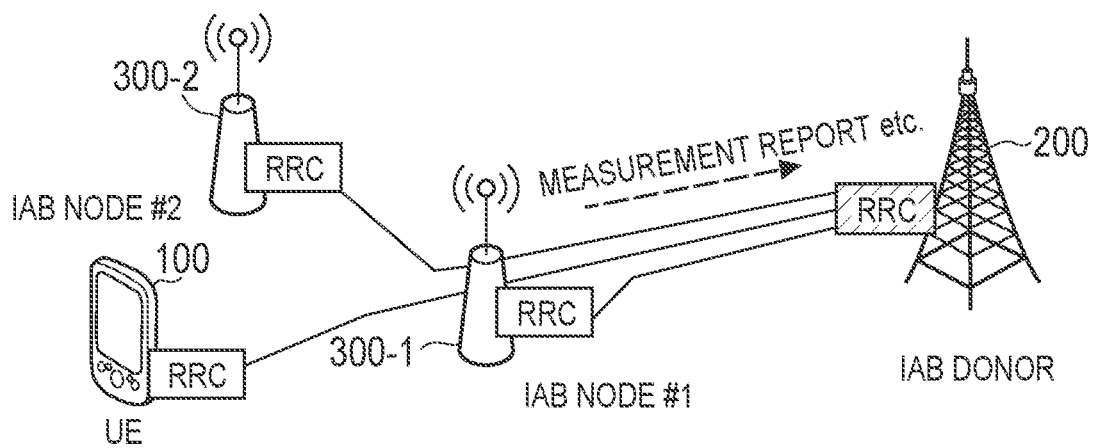
FIG. 11 is a diagram illustrating an operation example according to a third embodiment.

FIG. 11 is a diagram illustrating an operation example according to the third embodiment.

As illustrated in FIG. 11, the IAB node (IAB node #1) 300-1 is connected by radio to the donor gNB (IAB donor) 200, and the IAB node (IAB node #2) 300-2 and the UE 100 are connected by radio to the IAB node 300-1. An F1 interface, which is a network interface for fronthaul, may be configured between the donor gNB 200 and the IAB node 300-1. An F1 interface may also be configured between the donor gNB 200 and the IAB node 300-2.

The IAB node 300-1 has an RRC layer, and an RRC message is sent and received between an RRC layer of the IAB node 300-1 and an RRC layer of the donor gNB 200. Further, the IAB node 300-2 has an RRC layer, and an RRC message is sent and received via the IAB node 300-1 between an RRC layer of the IAB node 300-2 and an RRC layer of the donor gNB 200. These RRC messages may be sent and received on the F1 interface. Alternatively, instead of the RRC message, an F1 message specified by the F1 interface may be sent and received on the F1 interface. Alternatively, an Xn interface may be used. In a case where the Xn interface is used, "F1 interface" below is read as "Xn interface". Furthermore, the UE 100 has an RRC layer, and an RRC message is sent and received via the IAB node 300-1 between an RRC layer of the UE 100 and an RRC layer of the donor gNB 200.

The RRC message and/or F1 message sent to the donor gNB 200 may include a Measurement Report message indicating a measured radio state. For example, each of the IAB node 300-1, the IAB node 300-2, and the UE 100 performs measurement of a radio state (for example, measurement of Reference Signal Received Power (RSRP), which is receiving power of a reference signal, and/or Reference Signal Received Quality (RSRQ), which is receiving quality of a reference signal) and sends a measurement report message including a measurement result to the donor gNB 200.

The RRC message and/or F1 message sent to the donor gNB 200 may include a message notifying a measured load state (particularly a state of resource load). Such a message may be referred to as a Resource Status Update message. For example, each of the IAB node 300-1 and the IAB node 300-2 measures a usage rate of time/frequency resources, which are radio resources, and a usage rate of hardware resources (CPU, memory, and the like), and sends a message including a measurement result to the donor gNB 200. The usage rate of time/frequency resources may be a usage rate of time/frequency resources in the access link or a usage rate of time/frequency resources in the backhaul link.

The RRC message and/or F1 message sent to the donor gNB 200 may include a message notifying a measured communication delay state. For example, each of the IAB node 300-1 and the IAB node 300-2 measures at least one of backhaul delay time, hop count (for example, hop count to the donor gNB 200), and scheduling delay, and sends a message including a measurement result to the donor gNB 200. Here, measurement of delay time (backhaul delay, scheduling delay) is time until a response to transmission of a message is received, and obtained by measuring time until a response is returned after performing, for example, poling by RLC. Further, the hop count is measured (for each bearer) by counting up the number in the header each time the Adaptation layer or the like relays data and reading this value. Alternatively, each IAB node may notify its own hop count and the hop count to the UE may be calculated based on the notification.

Note that these messages may be defined as a response to a request (inquiry) from the gNB 200. Alternatively, these messages may be periodically sent to the donor gNB 200 or may be sent to the donor gNB 200 by an event trigger. In the case of an event trigger, the donor gNB 200 may configure a threshold value for the event trigger (radio state threshold value, load state threshold value, delay state threshold value) for the IAB node 300 and the UE 100 under the donor gNB 200.

Further, each of a radio state, a load state, and a communication delay state may be measured and notified of separately for the uplink (UL) and the downlink (DL), or a result (for example, an average value) obtained by statistically processing a UL measurement result and a DL measurement result may be notified of.

Furthermore, one RRC message or one F1 message that includes two or more of a radio state, a load state, and a communication delay state may be defined. The donor gNB 200 manages or changes the connection relationship (topology) of the IAB node 300 and the UE 100 under the donor gNB 200, and manages or changes a data transfer path (routing table) based on the RRC message and/or the F1 message. For example, the donor gNB 200 changes the connection relationship and/or the data transfer path by performing handover of the IAB node 300 under the donor gNB 200. The handover of the IAB node 300 will be described in a fourth embodiment.

FIG. 12(a) illustrates an example of creation of a connection relationship (topology) in the donor gNB 200, and FIG. 12(b) illustrates an example of creation of a routing table in the donor gNB 200. In FIGS. 12(a) and B, the donor gNB 200 is denoted as "D", six of the IAB nodes 300 are denoted as "1" to "6", and the UE (terminal) 100 is denoted as "U".

As illustrated in FIG. 12(a), the donor gNB "D" derives a relationship between nodes for which a data transfer path (route) is likely to be established based on a radio state (RSRP, and the like) notified from the IAB node 300 and the UE 100 under the donor gNB "D". For example, the donor gNB "D" determines that a route can be established between nodes in a case where a radio state between the nodes satisfies certain quality.

In the example of FIG. 12(a), the donor gNB "D" determines that four routes can be configured between the donor gNB "D" and the UE "U". The first route is "D"→"1"→"2"→"4"→"U". The second route is "D"→"1"→"2"→"5"→"U". The third route is "D"→"3"→"5"→"U". The fourth route is "D"→"3"→"6"→"U". The donor gNB "D" may notify the corresponding IAB nodes of information on these routes and set the information thereto. For such notification and setting, for example, an RRC reconfiguration message may be used. Note that, although route configuration in a downlink is assumed here, route configuration in an uplink may be performed.

As illustrated in FIG. 12(b), the donor gNB "D" determines a load state and a communication delay state between nodes based on a load state and a communication delay state notified from the IAB node 300 under the donor gNB "D", and selects and sets one of the four routes.

In the example of FIG. 12(b), in each of the first route ("D"-"1"-"2"-"4"-"U") and the second route ("D"-"1"-"2"-"5"-"U"), the hop count indicating the number of IAB nodes on the route is three (three hops). In contrast, in each of the third route ("D"-"3"-"5"-"U") and the fourth route ("D"-"3"-"6"-"U"), the hop count indicating the number of IAB nodes on the route is two (two hops). In such a case, the donor gNB "D" may preferentially select the first route and the second route.

Further, in the example of FIG. 12(b), the backhaul link between the IAB node "2" and the IAB node "4" and the backhaul link between the IAB node "2" and the IAB node "5" are in a high load state (Loaded), and the access link between the IAB node "6" and the UE "U" is in a high load state (Loaded). In such a case, the donor gNB "D" may preferentially select the third route that does not go through a link in a high load state.

When selecting a route, the donor gNB "D" updates a routing table according to the selected route and sends a message (for example, an RRC reconfiguration message) for configuring the selected route to the node on the route. After that, the donor gNB "D" updates the routing table at any time according to the load state and the communication delay state of each link.

[Variation of the Third Embodiment]

In the third embodiment described above, each of the IAB nodes 300 under the donor gNB 200 may notify the donor gNB 200 of MBMS-related information regarding interest in a Multimedia Broadcast Multicast Service (MBMS) service. The MBMS-related information may be an RRC message or an F1 message.

The MBMS-related information transmitted by the IAB node 300 may be relay necessity information of the MBMS service in the IAB node 300. The MBMS-related information transmitted by the IAB node 300 may be information indicating the number of apparatuses interested in the MBMS service among lower apparatuses (the UE 100 and the IAB node 300) under the IAB node 300. The MBMS-related information may be provided for each identifier (for example, Temporary Mobile Group Identity (TMGI)) of the MBMS service.

In the present variation, the donor gNB 200 manages or modifies at least one of the connection relationship (topology) and the data transfer path based on the MBMS-related information notified from each of the IAB nodes 300 under the donor gNB 200. For example, the donor gNB 200 manages or changes the data transfer path for the MBMS service based on the notified MBMS-related information.

In the present variation, each of the IAB nodes 300 may belong to at least one MBMS Service Area. The MBMS Service Area is a unit of an area in which the same MBMS service is provided. In such a case, the donor gNB 200 may configure the MBMS Service Area to the IAB node 300 when configuring the F1 interface with the IAB node 300. For example, the F1 Setup Request message and the F2 Setup Response message may include an MBMS Service Area Identity List.

Fourth Embodiment

The fourth embodiment will be described based mainly on a difference from the first to third embodiments described above. The fourth embodiment may be implemented in combination with at least one of the first to third embodiments described above.

A communication control method according to the fourth embodiment is a method in a mobile communication system in which a data transfer path via at least one IAB node 300 is configured between the donor gNB 200 and the UE 100. In the fourth embodiment, the upper apparatus transmits a handover request for performing handover of the IAB node 300 under the upper apparatus to another upper apparatus. Here, the upper apparatus is another IAB node (upper IAB node) under the donor gNB 200 or the donor gNB 200. The upper apparatus may be an apparatus that has an RRC connection with the IAB node 300 for which handover needs to be performed (that is, an apparatus that has an RRC layer). In the fourth embodiment, an example in which an upper apparatus as a transmission source of a handover request is the donor gNB 200 will be mainly described. Further, another upper apparatus as a transmission destination of a handover request is a gNB different from the donor gNB 200 which is a transmission source of a handover request, or another IAB node under the gNB. In the fourth embodiment, an example in which another upper apparatus as a transmission source of a handover request is a gNB will be mainly described. Specifically, the handover request is transmitted and received on the Xn interface, which is an interface between base stations.

In the fourth embodiment, the handover request includes information indicating whether or not the IAB node 300 for which handover needs to be performed is in a relaying state. The state in which the IAB node 300 performs data relay may be a state in which at least one of the UE 100 exists under the IAB node 300. Specifically, in a case where the relay function is activated in the IAB node 300 for which handover needs to be performed, the IAB node 300 establishes a backhaul link, and there is at least one of the UE 100 under the IAB node 300, the IAB node 300 can be regarded as being in a state of performing data relay. That there is at least one of the UE 100 under the IAB node 300 includes not only that the UE 100 is connected by radio to the IAB node 300, but also that the UE 100 is connected to the IAB node 300 via at least one another IAB node. Alternatively, the state in which the IAB node 300 performs data relay may mean a state in which a data transfer path via the IAB node 300 is configured. Hereinafter, the state in which the IAB node 300 performs data relay is referred to as "IAB active state".

In contrast, the state in which the IAB node 300 does not perform data relay may be a state in which at least one of the UE 100 does not exist under the IAB node 300. Specifically, in a case where the relay function is not activated in the IAB node 300 for which handover needs to be performed, or the IAB node 300 does not establish a backhaul link, the IAB node 300 can be regarded as being in a state of not performing data relay. Alternatively, in a case where the IAB node 300 establishes a backhaul link and there is no UE 100 under the IAB node 300, the IAB node 300 can be regarded as being in a state of not performing data relay. Alternatively, the state in which the IAB node 300 does not perform data relay may mean a state in which a data transfer path via the IAB node 300 is not configured. Hereinafter, the state in which the IAB node 300 does not perform data relay is referred to as "IAB idle state".

As described above, a source gNB notifies a target gNB of whether the IAB node 300 for which handover needs to be performed is in the IAB active state or the IAB idle state at the time of the handover request. In this manner, the target gNB can predict how much the load of the target gNB will increase by the handover, so that it is possible to appropriately determine whether or not to accept the handover request. Note that, in a case where handover is performed for the IAB node 300 under an upper IAB node from the upper IAB node to another IAB node, the source IAB node may notify a handover request of the target IAB node in the same way as that the source gNB notifies the target gNB of a handover request. In the description below, the source gNB and the target gNB may be replaced with the source IAB node and the target IAB node, respectively.

First, an example of handover of the IAB node 300 in the IAB idle state will be described with reference to Steps S208 to S211 of FIG. 8.

As illustrated in FIG. 8, in Step S208, the gNB 200-1 (source gNB) transmits a handover request message to a gNB 200-2 (target gNB) on the Xn interface. Here, the gNB 200-1 (source gNB) includes, in the handover request message, information indicating that the IAB node 300-1 for which handover needs to be performed is in the IAB idle state. Like the first embodiment, the gNB 200-1 (source gNB) may include, in the handover request, the IAB indication received from the IAB node 300-1. Alternatively, the gNB 200-1 may send, instead of including the IAB indication in the handover request message, information indicating a request that the target gNB functions as the donor gNB of the IAB node 300-1.

The gNB 200-2 determines whether or not to accept the handover of the IAB node 300-1 in consideration of the information included in the handover request message and indicating that the IAB node 300-1 is in the IAB idle state. Here, the description will proceed on the assumption that the gNB 200-2 determines to accept the handover of the IAB node 300-1.

In Step S209, the gNB 200-2 sends a handover acknowledgment message to the gNB 200-1 on the Xn interface.

In Step S210, the gNB 200-1 transmits a handover instruction message (RRC reconfiguration message) to the IAB node 300-1 based on the handover acknowledgment message from the gNB 200-2. The handover instruction message includes information that designates (a cell of) the gNB 200-2 as a handover destination.

In Step S211, the IAB node 300-1 performs handover for the gNB 200-2 based on the handover instruction message from the gNB 200.

Figure 13:
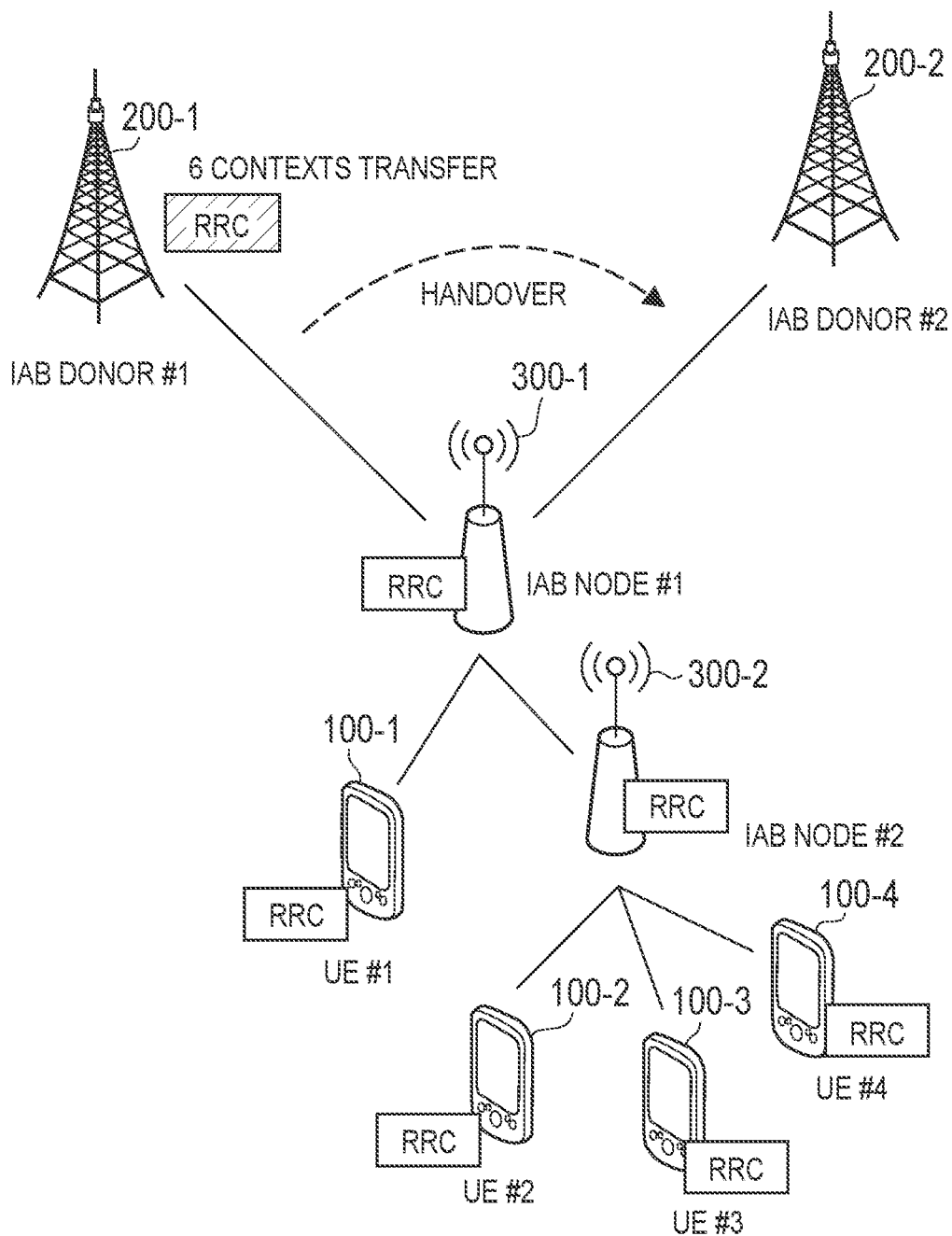
FIG. 13 is a diagram illustrating an example of handover of the IAB node in an IAB active state according to the third embodiment.

Next, an example of handover of the IAB node 300 in the IAB active state will be described with reference to FIG. 13. FIG. 13 is a diagram illustrating an example of handover of the IAB node 300 in the IAB active state.

As illustrated in FIG. 13, the IAB node (IAB node #1) 300-1 is connected by radio to the donor gNB (IAB donor #1) 200-1, and the IAB node (IAB node #2) 300-2 and the UE (UE #1) 100-1 are connected by radio to the IAB node 300-1. Further, UEs (UEs #2 to #4) 100-2 to 100-4 are connected by radio to the IAB node 300-2. Each of the IAB nodes 300 and each of the UEs 100 has an RRC layer.

In the example of FIG. 13, it is assumed that handover of the IAB node 300-1 is performed from the donor gNB 200-1 to the donor gNB 200-2. The IAB node 300-1 is in the IAB active state because there are four of the UEs 100-1 to 100-4 and the IAB node 300-2 under the IAB node 300-1.

The donor gNB 200-1 (source gNB) sends a handover request message to the donor gNB 200-2 (target gNB) on the Xn interface. Here, the donor gNB 200-1 (source gNB) includes, in the handover request message, information indicating that the IAB node 300-1 for which handover needs to be performed is in the IAB active state.

As illustrated in FIG. 13, in a case where handover of the IAB node 300-1 in the IAB active state is performed from the donor gNB 200-1 to the donor gNB 200-2, handover is performed collectively for the IAB node 300-2 and the UEs 100-1 to 100-4 under the IAB node 300-1. However, it is only required that IAB node 300-1 performs a random access procedure for the donor gNB 200-2, and the IAB node 300-2 and the UEs 100-1 to 100-4 under the IAB node 300-1 do not need to perform a random access procedure for the donor gNB 200-2.

Further, the donor gNB 200-1 collectively transfers context information of the IAB nodes 300 (300-1 and 300-2) under the donor gNB 200-1 and the UEs 100 (100-1 to 100-4) under the donor gNB 200-1 to the donor gNB 200-2. The donor gNB 200-1 may include these pieces of context information in one handover request and transmit the handover request to the donor gNB 200-2.

In a case where handover of the IAB node 300-1 in the IAB active state is performed from the donor gNB 200-1 to the donor gNB 200-2, the donor gNB 200-1 may transmit a handover request including load information related to the IAB nodes 300 (300-1 and 300-2) under the donor gNB 200-1 and/or the UEs 100 (100-1 to 100-4) under the donor gNB 200-1 to the donor gNB 200-2.

Here, the load information may include the number of UEs 100 (100-1 to 100-4) under the donor gNB 200-1. For example, the donor gNB 200-1 identifies the number of the UEs 100 (100-1 to 100-4) under the donor gNB 200-1 based on the number of UE contexts managed by the donor gNB 200-1 itself or the number of Cell-Radio Network Temporary Identifiers (C-RNTIs), or the routing information that the donor gNB 200-1 manages itself, and includes the identified number in the handover request. However, in a case where a plurality of data transfer paths are configured for one UE 100 and the plurality of data transfer paths include a primary path and a secondary path, the UE 100 that does not have a primary path with the donor gNB 200-1 may be excluded. In such a case, the donor gNB 200-1 includes, in the handover request, as load information, the number of the UEs 100 that have a primary path with the donor gNB 200-1 among the UEs 100 under the donor gNB 200-1. Alternatively, the number of bearers used by the UE 100 may be included in the handover request as load information instead of the number of the UEs 100. The QoS information associated with the bearer may be further included in the handover request. The load information may include the number of the IAB nodes 300 (300-1 and 300-2) under the donor gNB 200-1. The load information may include the number of layers (hops) of the IAB nodes 300 under the donor gNB 200-1 and/or the number of the IAB nodes and/or the UEs 100 under each layer.

Furthermore, the donor gNB 200-1 may include, in the handover request, the MBMS-related information described in the variation of the third embodiment.

Fifth Embodiment

The fifth embodiment will be described based mainly on a difference from the first to fourth embodiments described above. The fifth embodiment may be implemented in combination with at least one of the first to fourth embodiments described above.

In the fourth embodiment, the example in which the donor gNB 200 takes the lead in performing the handover of the IAB node 300 is described. In contrast, the fifth embodiment is an embodiment in which the IAB node 300 takes the lead in performing RRC Re-establishment. The IAB node 300 performs RRC Re-establishment when a failure occurs in the radio connection with an upper apparatus to which the IAB node 300 is connected. Such a failure in the radio connection is sometimes referred to as Radio Link Failure (RLF).

Figure 14:
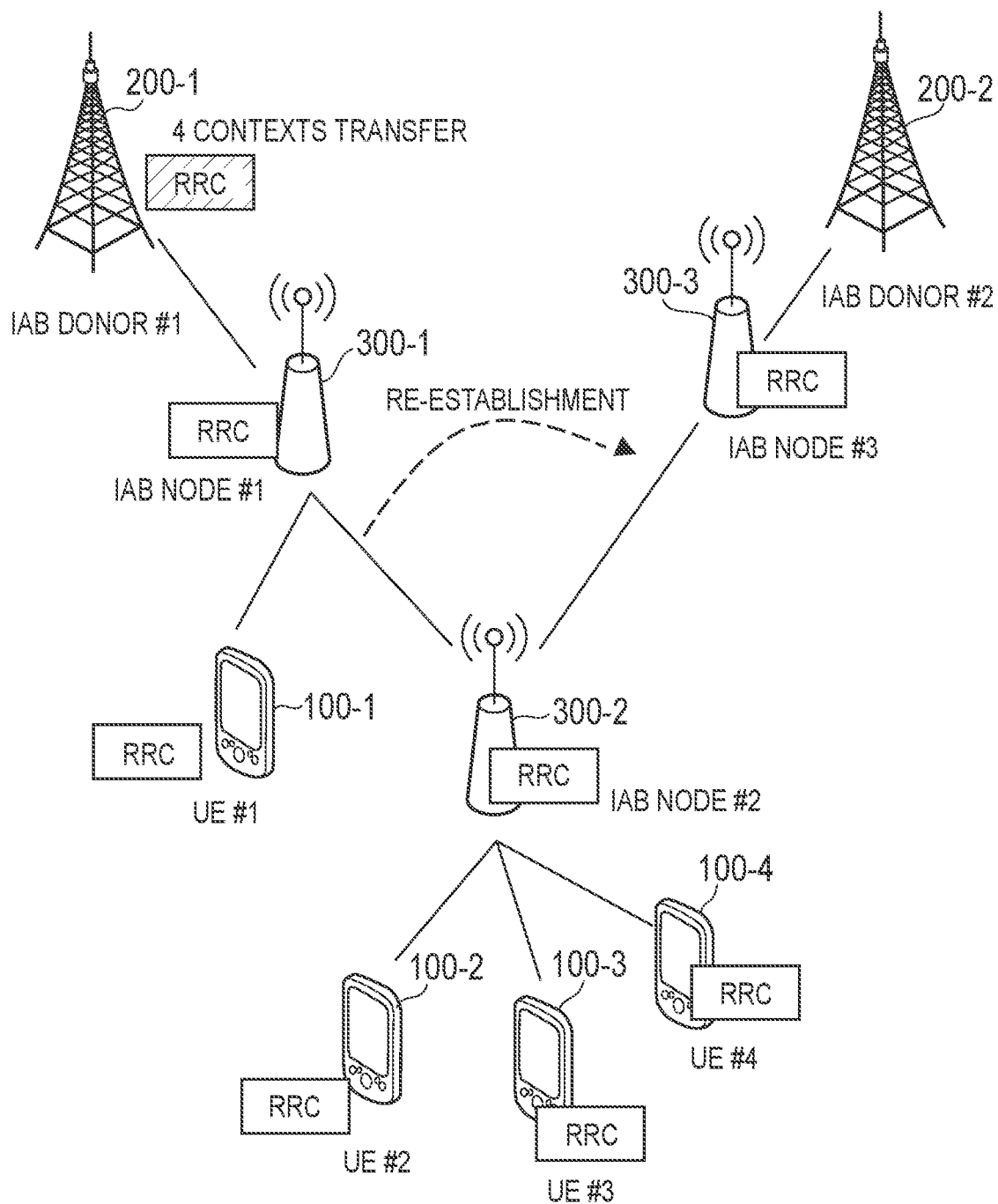
FIG. 14 is a diagram illustrating an example of an operation environment according to a fifth embodiment.

FIG. 14 is a diagram illustrating an example of an operation environment according to the fifth embodiment. FIG. 14 has the same basic configuration as FIG. 13, but differs from FIG. 13 in that an IAB node (IAB node #3) 300-3 is connected by radio to the donor gNB 200-2. Under such an environment, it is assumed that the IAB node 300-2 under the donor gNB 200-1 detects RLF with the IAB node 300-1.

When detecting RLF with the IAB node 300-1, the IAB node 300-2 searches for the gNB 200 or the IAB node 300 that can be connected to, other than the IAB node 300-1, and attempts to reestablish a radio connection to the found gNB 200 or IAB node 300. In the example of FIG. 14, the IAB node 300-2 finds the IAB node 300-3 under the donor gNB 200-2, which is different from the donor gNB 200-1 before RLF, and attempts to reestablish a radio connection to the IAB node 300-3.

However, when the IAB node 300-2 is connected to the IAB node 300-3 under another donor gNB 200-2, the UE context of the UEs 100-2 to 100-4 under the IAB node 300-2 needs to be transferred from the donor gNB 200-1 to the donor gNB 200-2. Further, it may also be necessary to establish a new F1 interface between the donor gNB 200-2 and the IAB node 300-2. Therefore, the above is not preferable from the viewpoint of a signaling amount and delay. In contrast, when, after detecting RLF with the IAB node 300-1, the IAB node 300-2 is connected to the donor gNB 200-1 or connected to another IAB node (not illustrated) under the donor gNB 200-1, increase in a signaling amount and delay can be suppressed.

Note that, instead of the case where RLF occurs between the IAB node 300-2 and the IAB node 300-1 as described above, in a case where RLF occurs between the donor gNB 200-1 and the IAB node 300-1 and the IAB node 300-1 reestablishes a radio connection with the donor gNB 200-2 or the IAB node 300-3, a similar problem occurs.

In the fifth embodiment, the IAB node 300 having a radio connection to the donor gNB 200 or an IAB node under the donor gNB 200 acquires and stores a first identifier associated with the donor gNB 200. When, for example, detecting RLF, the IAB node 300 acquires, from a candidate apparatus that is a candidate for a reestablishment destination of a radio connection, a second identifier associated with the donor gNB corresponding to the candidate apparatus. The IAB node 300 reestablishes a radio connection for the candidate apparatus in a case where the first and second identifiers are associated with the same donor gNB 200.

Such an identifier may be referred to as "IAB Area ID" or "IAB topology ID". A unique identifier is assigned to a group consisting of one donor gNB 200 and the IAB node 300 under the donor gNB 200. The unique identifier may be the ID of the donor gNB 200 (gNB ID) or the cell ID of the donor gNB 200 (for example, CGI: Cell Global Identity). Such an identifier is configured by the donor gNB 200 to the IAB node 300 by, for example, an RRC Reconfiguration message at the time of set up of the IAB node, at the time of configuration change, or the like. Each IAB node 300 broadcasts an identifier configured for the IAB node 300 itself by SIB or the like. Note that the gNB 200 also broadcasts the above identifier by SIB or the like.

In the example of FIG. 14, the IAB node 300-2 acquires and stores the first identifier associated with the donor gNB 200-1. The IAB node 300-2 may use the identifier configured by the RRC Reconfiguration message by the donor gNB 200-1 as the first identifier, or the identifier broadcast by the IAB node 300-1 as the first identifier.

Then, when detecting RLF with the IAB node 300-1, the IAB node 300-2 searches for a candidate apparatus (candidate cell) that is a candidate for a reestablishment destination of a radio connection. In the searching, the IAB node 300-2 searches for a connectable cell by a cell search, and, in a case where a receiving state of a reference signal from a cell found by the search is better than a threshold value, the IAB node 300-2 may regard the cell as a candidate apparatus (candidate cell).

The IAB node 300-2 acquires, as the second identifier, an identifier (IAB Area ID) broadcast by the found candidate apparatus. The IAB node 300-2 compares the stored first identifier with the acquired second identifier. In a case where these identifiers are the same, it means that the found candidate apparatus is under the same donor gNB 200 as that before RLF. Therefore, the IAB node 300-2 attempts to reestablish a radio connection to the found candidate apparatus in a case where these identifiers are the same.

Note that the IAB node 300-2 generally selects a candidate apparatus having a most excellent receiving state based on the rankings in a case where a plurality of candidate apparatuses whose reference signals are in a receiving state that satisfies the threshold value are found as a result of the cell search. Therefore, the IAB node 300-2 may select a candidate apparatus (cell) that broadcasts the same identifier as the stored identifier without depending on the rankings by giving a highest priority to the candidate apparatus (cell). Alternatively, the IAB node 300-2 may select the candidate apparatus (cell) by providing an infinite offset to a receiving state of a candidate apparatus (cell) that broadcasts the same identifier as the stored identifier and setting the candidate apparatus (cell) at a highest rank at the time of ranking.

However, the IAB node 300-2 may be unable to find a candidate apparatus (cell) that broadcasts the same identifier as the stored identifier as a result of the cell search. In such a case, the IAB node 300-2 will be connected to the donor gNB 200 different from that before RLF or the IAB node under the donor gNB 200. In a case where the IAB node 300-2 is connected to the donor gNB 200 different from that before RLF or the IAB node under the donor gNB 200, the stored identifier (first identifier) may be notified to the apparatus (cell) as a connection destination. The apparatus as a connection destination may give notification to the donor gNB 200 corresponding to the identifier notified from the IAB node 300-2, so that the original donor gNB 200 updates topology management and routing management of its own network. Alternatively, the apparatus as a connection destination may request the donor gNB 200 corresponding to the identifier notified from the IAB node 300-2 to transfer context information corresponding to the IAB node 300-2. Alternatively, the apparatus as a connection destination may perform handover of the IAB node 300-2 for the donor gNB 200 corresponding to the identifier notified from the IAB node 300-2.

Note that, in the present embodiment, the operation in which the IAB node 300 selects a reestablishment destination of a radio connection is mainly described. However, the UE 100 may perform such an operation.

[Variation of the Fifth Embodiment]

In the fifth embodiment described above, the IAB node 300-2 may acquire, from the donor gNB 200-1, and store a list of identifiers (gNB ID and DGI) of each of the donor gNB 200-1 and the IAB node 300 under the donor gNB 200-1 before RLF is detected. The donor gNB 200-1 may provide an updated list to the IAB node 300-2 each time the IAB node 300 under the donor gNB 200-1 is added or deleted. In detection of RLF, the IAB node 300-2 may search for an apparatus (cell) having an identifier in the stored list and attempt to reestablish a radio connection to the found apparatus (cell).

Sixth Embodiment

The sixth embodiment will be described based mainly on a difference from the first to fifth embodiments described above. The sixth embodiment may be implemented in combination with at least one of the first to fifth embodiments described above.

The communication control method according to the sixth embodiment is a method in a mobile communication system in which a data transfer path via at least one IAB node 300 is configured between the donor gNB 200 and the UE 100. In the sixth embodiment, the IAB node 300 sends, to an upper apparatus, a first buffer status report that indicates at least an amount of data available to the IAB node 300 for uplink transmission. Here, the upper apparatus is another IAB node (upper IAB node) under the donor gNB 200 or the donor gNB 200. The upper apparatus allocates radio resources for uplink transmission to the IAB node 300 based on the first buffer status report.

As described above, in the sixth embodiment, a buffer status report (BSR) for the IAB node is introduced, so that an upper apparatus to which the IAB node is connected can appropriately allocate radio resources for uplink transmission to the IAB node.

Specifically, the IAB node 300 has an uplink buffer that temporarily stores data waiting for uplink transmission. For example, the MAC layer of the IAB node 300 notifies the MAC layer of an upper apparatus of a first buffer status including information indicating a data amount in the uplink buffer. The MAC layer of the upper apparatus has a scheduler, allocates uplink radio resources to the IAB node 300 based on the first buffer status, and notifies the IAB node 300 of the allocated resources via the control channel.

Here, since the IAB node 300 buffers uplink data for a plurality of UEs, it is considered that the IAB node 300 has an uplink buffer of larger capacity than the UE 100. Therefore, the buffer status report for the IAB node may have a different format from the buffer status report for the UE. Further, the data amount that can be expressed by the buffer status report for the IAB node (maximum data amount) may be larger than the data amount that can be expressed by the buffer status report for the UE (maximum data amount).

The buffer status report for the IAB node may include information on the number of UEs 100 under the IAB node 300. The IAB node 300 may determine the number of UEs 100 under the IAB node 300 based on UE context, C-RNTI, or the like. The donor gNB 200 may notify the IAB node 300 of the number of UEs 100 under the IAB node 300. The IAB node 300 may include, in the buffer status report, the number of the UEs 100 that has data in the uplink buffer of the IAB node 300 among the UEs 100 under the IAB node 300. In other words, the IAB node 300 may notify the upper apparatus of how many UEs of uplink data the IAB node 300 has by the buffer status report. Alternatively, the IAB node 300 may include, in the buffer status report, the number of the UEs 100 in an RRC connected state among the UEs 100 under the IAB node 300.

The buffer status report for the IAB node may take into account not only the amount of data actually existing in the uplink buffer of the IAB node 300, but also the buffer status report (that is, a potential uplink data amount) from the lower apparatus. In this manner, the upper apparatus can allocate uplink radio resources to the IAB node 300 in advance in consideration of a potential uplink data amount, so that transmission delay in an uplink due to multi-hop can be reduced.

The lower apparatus is a lower IAB node and the UE 100 under the IAB node 300. The IAB node 300 receives, from the lower apparatus, a second buffer status report indicating the amount of data available to the lower apparatus for uplink transmission. Based on the second buffer status report, the IAB node 300 transmits, to the upper apparatus, the first buffer status report based on the amount of data available to the IAB node 300 for uplink transmission and the amount of data available to the lower apparatus for uplink transmission. For example, the IAB node 300 may include, in the first buffer status report, the sum of the amount of data available to the IAB node 300 for uplink transmission and the amount of data available to the lower apparatus for uplink transmission. Alternatively, the IAB node 300 may include, in the first buffer status report, a first BSR value indicating the amount of data available to the IAB node 300 for uplink transmission and a second BSR value indicating the amount of data available to the lower apparatus for uplink transmission.

Seventh Embodiment

The seventh embodiment will be described based mainly on a difference from the first to sixth embodiments described above. The seventh embodiment may be implemented in combination with at least one of the first to sixth embodiments described above.

The communication control method according to the seventh embodiment is a method in a mobile communication system in which a data transfer path via at least one IAB node 300 is configured between the donor gNB 200 and the UE 100. In the seventh embodiment, the first IAB node under the donor gNB 200 or the UE under the first IAB node sends, to the upper apparatus, a request to change a data transfer path from a first path via the first IAB node to a second path via the second IAB node 300. Here, the upper apparatus is an upper IAB node under the donor gNB 200 or the donor gNB 200. In the seventh embodiment, an example in which the upper node is the donor gNB 200 will be mainly described.

Figure 15:
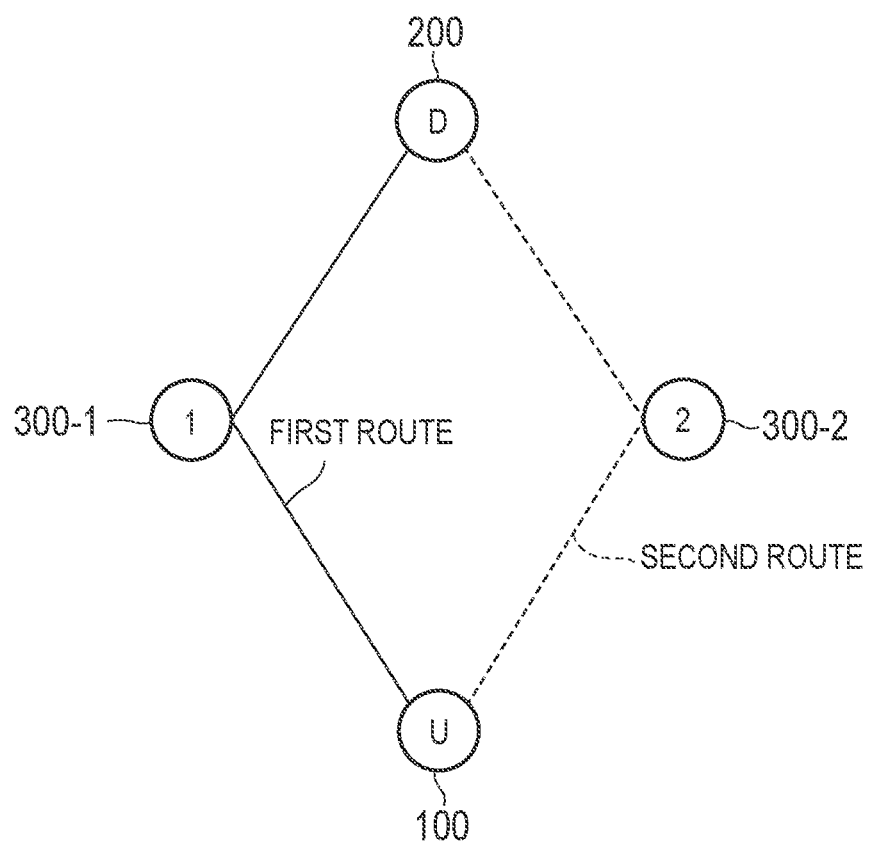
FIG. 15 is a diagram illustrating an operation example according to a seventh embodiment.
Figure 17:
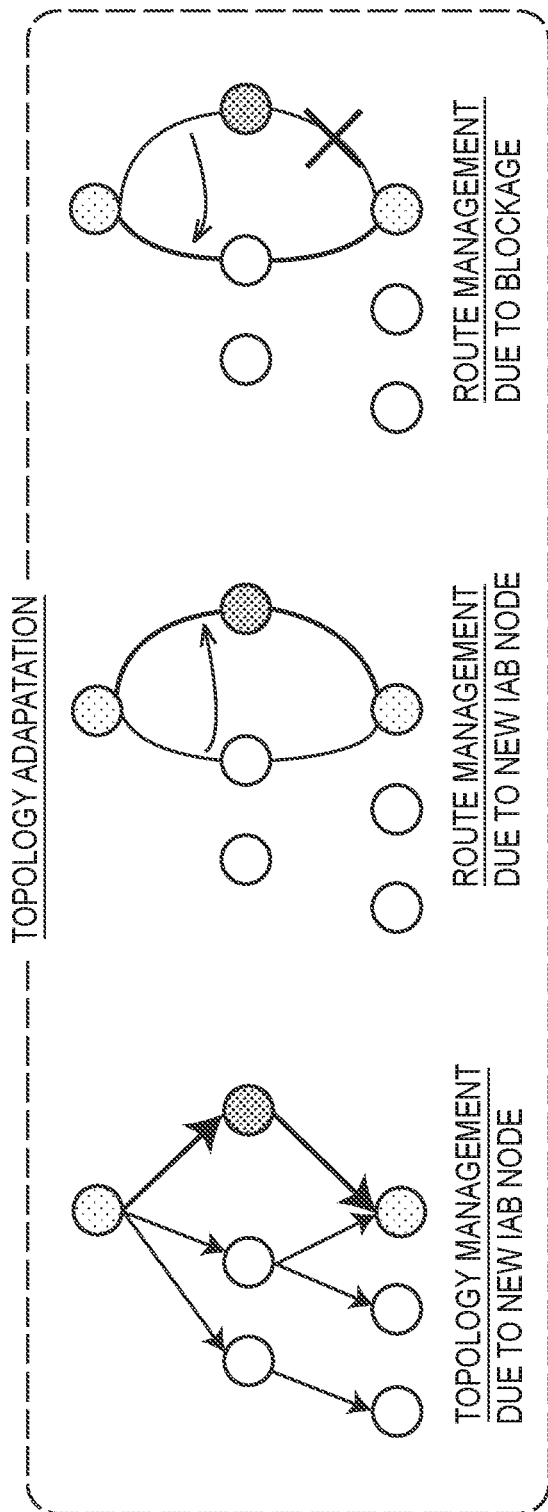
FIG. 17 is a diagram illustrating an example of topology management and path management.

FIG. 15 is a diagram illustrating an operation example according to the seventh embodiment. In FIG. 15, the donor gNB 200 is denoted as "D", two of the IAB nodes 300 are shown as "1" and "2", and the UE 100 is denoted as "U".

As illustrated in FIG. 15, the IAB node 300-1 or the UE 100 sends, to the donor gNB 200-1, a request to change a data transfer path from the first path via the IAB node 300-1 to the second path via the IAB node 300-2. Such a request may be an F1 message sent and received on the F1 interface, an Xn message sent and received on the Xn interface, or an RRC message. For example, the IAB node 300-1 or the UE 100 may transmit such a request in a case where quality (radio state and the like) in the first path deteriorates.

Here, in addition to the first path, the second path may be established in advance. That is, the first path and the second path may coexist. The first path may be the primary path (main path) and the second path may be the secondary path (spare path). In that case, in a case where the amount of data to be transmitted to the first path (resources used for data transmission) reaches the upper limit, the data may be transmitted to the second path. Alternatively, the first path is released and the second path may be established. That is, the first path and the second path do not have to coexist. Alternatively, in a case where the data transmitted to the first path does not reach a transmission destination (Ack cannot be received from the transmission destination), the same data may be transmitted to the second path.

The request sent from the IAB node 300-1 or the UE 100 to the donor gNB 200 includes at least one of a request to pass control of the primary path to the second IAB node 300, an establishment request requesting establishment of the second path, a release request requesting release of the first path, a change request requesting a configuration change for the second path that has already been established, and an allocation request requesting resource allocation for the second path that has already been established. Each of these requests may be defined as a separate message, or one message that combines two or more requests may be defined.

Such a message includes, as an information element, at least one of a transmission source identifier of the message, a transmission destination identifier of the message, an identifier of a lower apparatus (the IAB node or the UE that is a child node) for which path change is to be performed, an identifier of the bearer corresponding to the first path and/or the second path, and cause information (Cause). In the case of configuration change of the second path or resource allocation change, the message may further include the resource amount desired to be changed or the ratio of the data amount flowing to itself (for example, the reduction rate of the data flowing to itself).

For example, the IAB node 300-1 or the UE 100 may request control of the primary path of the primary path to be passed from the IAB node 300-1 to another IAB node after the first path, which is the primary path, is established. The donor gNB 200 identifies another path (the second path) in response to the request, and then performs processing of providing control to the IAB node 300-2 that constitutes the another path.

Other Embodiments

An example in which the mobile communication system 1 is a 5G mobile communication system is mainly described in the above embodiment. Alternatively, the base station in the mobile communication system 1 may be an eNB. Furthermore, the core network in the mobile communication system 1 may be Evolved Packet Core (EPC). Furthermore, the gNB may be connected to the EPC, the eNB may be connected to the 5GC, and the gNB and the eNB may be connected to each other via an inter-base station interface (Xn interface, X2 interface).

A program for causing a computer to execute each processing described the above embodiment. In addition, the program may be recorded on a computer-readable medium. If a computer-readable medium is used, a program can be installed in the computer. Here, the computer-readable medium on which the program is recorded may be a non-transitory recording medium. The non-transitory recording medium is not particularly limited, but may be a recording medium such as a CD-ROM or a DVD-ROM. A chip set including a memory that stores a program for executing each processing by the UE 100 and the gNB 200 and a processor that executes the program stored in the memory may be provided.

Note that not limited to the case where each of the above-described embodiments is independently implemented, two or more embodiments may be combined and implemented. Further, the flows shown in each figure may be combined as appropriate.

APPENDIX

1. Introduction

RAN Plenary approved the study on Integrated Access and Backhaul (IAB) for NR. One of challenges in this study is the topology management and path selection in response to support of multi-hop networking. The TR captures the requirement for the topology adaptation.

5.2.2 Topology Adaptation

Wireless backhaul links are vulnerable to blockage, e.g., due to moving objects such as vehicles, due to seasonal changes (foliage), or due to infrastructure changes (new buildings). Such vulnerability also applies to physically stationary IAB-nodes. Also, traffic variations can create uneven load distribution on wireless backhaul links leading to local link or node congestion.

Topology adaptation refers to procedures that autonomously reconfigure the backhaul network under circumstances such as blockage or local congestion without discontinuing services for UEs.

Requirement: Topology adaptation for physically fixed relays shall be supported to enable robust operation, e.g., mitigate blockage and load variation on backhaul links.

In this appendix, the initial consideration of topology/path management procedure is discussed.

2. Discussion

2.1. Principle of Topology Adaptation Design

The TR captures a couple of IAB topologies, i.e., Spanning Tree (ST) and Directed Acyclic Graph (DAG), and the link/path redundancy in DAG, as shown in FIGS. 16A, 16B and 16C.

The (re-)formation of topology would be performed due to node-level changes, e.g., a new IAB node installed in the network through the procedure of "Integration of IAB-node." It will happen once in a long term and may be referred as "topology management".

On the other hand, the (re-)selection of link/path would be caused by link-level variations, e.g., blockage due to RLF or congestion, and also done after the topology management above. It will happen frequently relatively in a short term and may be referred as "path management".

The "topology adaptation" could be considered as an autonomous (re-)configuration mechanism for both of the "topology management" and the "path management", according the TR. In other words, it's preferred that the topology adaptation is a unified mechanism to be applied to the (re-)formation of IAB network topology and the (re-)selection of path within the topology, that includes the initial deployment phase and the network operation phase from the perspectives of IAB nodes and IAB donor.

Observation 1: A unified approach would be preferred for the topology adaptation to be performed for topology management (e.g., in initial deployment phase) and path management (e.g., in network operation phase).

In our understanding, the topology adaptation is seen as a kind of mobility scenario, so it's basically realized by the existing mobility functions, i.e., handover and cell (re-)selection. It may imply that the topology adaptation has a couple of design options, i.e., NW-controlled approach and UE-based approach; or it will be more suitable to say either IAB donor-controlled mechanism or IAB node-based mechanism, in the context of IAB study.

Observation 2: Topology adaptation would have a couple of design options, i.e., IAB donor-controlled mechanism or IAB node-based mechanism.

Wireless backhaul links are vulnerable to blockage, e.g., due to moving objects such as vehicles, due to seasonal changes (foliage), or due to infrastructure changes (new buildings). And also, traffic variations can create uneven load distribution on wireless backhaul links leading to local link or node congestion. Thus, the topology adaptation should take into account the current network performances such as channel quality, number of hops (latency), load information etc. On the other hand, some of the information is already available on F1-AP, e.g., the measurement report, so it's expected that the IAB donor should get hold of such information since it has CU-CP entity. In addition, the IAB donor has individual RRC connections towards each IAB node (i.e., the MT in IAB node). So, it's not difficult for the IAB donor to acquire the detailed information from each IAB node (through the MT entity in) and UEs. Also, the routing will be determined by the information in the IAB node. In this sense, the IAB donor-controlled topology adaptation, i.e., with handover, could be the baseline.

Proposal 1: RAN2 should agree that the existing handover procedure is the baseline of topology adaptation, assuming the IAB donor has enough information for routing.

2.2. Issue in IAB Node in Setup and Operation Phases

In this section, the issues in initial phase are considered from IAB node power-on to in operation.

At the power-on of an IAB node, the MT entity of IAB node access a cell to connect to OAM and to acquire some information for node discovery/selection, as captured under step 1 of "Integration of IAB node." The MT entity needs to access IAB-capable cell (or hopefully IAB "donor"-capable cell) since it's expected to be handed over to a suitable IAB donor/node at the next step, if Proposal 1 is agreeable. One of simple solution would be to have the SIB Indication.

Proposal 2: RAN2 should discuss if the cell should indicate whether the MT entity is allowed to access, e.g., with a SIB Indication.

At the setup of the IAB node, the MT entity will receive necessary configuration to establish e.g., F1 connection, PDU session, and topology/path etc., as captured under step 2 of "Integration of IAB node." With regard to the topology/path management, it could be assumed that it's a bearer configuration for relaying and done by RRC Reconfiguration, if Proposal 1 is agreeable.

After these setup, the IAB node starts providing service to UEs or other IAB nodes, as captured under step 3 of "Integration of IAB node."

Proposal 3: RAN2 should discuss if RRC Reconfiguration that contains IAB specific configuration, e.g., bearer configuration for relaying, completes the setup of IAB node.

If Proposal 3 is agreeable, it's questionable how the gNB knows whether the MT entity desires to operate as IAB node since "An IAB node can follow the same initial access procedure as an UE" in the initial access, i.e., it's unclear how to determine whether IAB specific reconfiguration is needed. In this sense, the MT entity should inform the gNB of its preference to operate as IAB node.

Proposal 4: RAN2 should discuss whether the MT entity is allowed to inform the NW of its preference with regard to IAB node operation.

In some cases, the NW may reject or release RRC connection towards the MT entity. Unless some IAB specific case value is included, the MT entity will retry the access to the cell (e.g., after the same wait time as normal UEs). However, if no suitable parent node is available for example, the MT entity should consider some other way around to get integrated in an appropriate IAB topology (e.g., waiting for a longer time). It may depend on deployment strategies and NW implementations, so it's helpful for IAB node implementation to discuss what the expected behavior is.

Proposal 5: RAN2 should discuss whether there is IAB specific reason to release/reject RRC connection, and if any, whether to have new cause values.

At the topology adaptation in operation phase, there are several scenarios, and some issues are observed in case to support inter-gNB (or inter-CU) topology adaptation. If the IAB node in service is handed over to another gNB, it will need the context transfer of not only the IAB node (i.e., its MT entity) but also all IAB nodes and UEs that are served by the IAB node. Since it's a kind of group mobility scenario, it may need some Xn signalling enhancements if it's handled efficiently. In addition, F1 connection re-establishment may be necessary in case of the inter-CU scenario.

Proposal 6: RAN2 should discuss whether to support the inter-gNB and/or inter-CU topology adaptation, that may require the context transfer of not only the IAB node but also the served IAB nodes and UEs.

Similar issue could be considered in case of RLF within IAB topology. Upon RLF, the MT entity will select a suitable cell and initiates RRC Re-establishment, staying in RRC Connected. It's useful to maintain the service continuity to the UEs, to fulfil the requirement "without discontinuing services for UEs." However, if the MT entity selects an IAB donor or an IAB nodes that is integrated within another IAB topology belonging to different IAB donor, then the same problem in Proposal 4 occurs upon the context fetch procedure. To ensure the re-establishment to the same IAB topology that the IAB node was previously integrated with, the MT entity should be informed of the IAB topology that the reselecting cell is belonging to. For example, the cell may broadcast an "IAB topology ID" and the MT entity takes it into account upon the re-establishment procedure.

Proposal 7: RAN2 should discuss whether the MT entity should take IAB topology identity into account upon RRC Re-establishment.

The invention claimed is:

1. A communication control method comprising:
 establishing, by a Layer 2 relay node, a Radio Resource Control (RRC) connection with a donor base station;
 receiving, by the Layer 2 relay node from the donor base station, a RRC reconfiguration message for establishing, while maintaining the RRC connection, a backhaul Radio Link Control (RLC) channel between the Layer 2 relay node and the donor base station; and
 receiving by the Layer 2 relay node, from the donor base station, identification information identifying a plurality of Layer 2 relay nodes under the donor base station, the identification information further identifying, for each of the plurality of Layer 2 relay nodes, a cell served by the corresponding Layer 2 relay node.

2. A Layer 2 relay node comprising:
 a controller configured to establish a Radio Resource Control (RRC) connection with a donor base station, and
 a receiver configured to receive, from the donor base station, a RRC reconfiguration message for establishing, while maintaining the RRC connection, a backhaul Radio Link Control (RLC) channel between the Layer 2 relay node and the donor base station, wherein
 the receiver is further configured to receive, from the donor base station, identification information identifying a plurality of Layer 2 relay nodes under the donor base station, the identification information further identifying, for each of the plurality of Layer 2 relay nodes, a cell served by the corresponding Layer 2 relay node.

* * * * *